US009973625B1

(12) United States Patent
Voorhees

(10) Patent No.: US 9,973,625 B1
(45) Date of Patent: May 15, 2018

(54) SYSTEM TO SHARE AND PRESENT TEMPORARY CONTACT INFORMATION

(71) Applicant: AMAZON TECHNOLOGIES, INC., Seattle, WA (US)

(72) Inventor: William Voorhees, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days. days.

(21) Appl. No.: 15/285,309

(22) Filed: Oct. 4, 2016

(51) Int. Cl.
  *H04M 1/66* (2006.01)
  *H04M 3/42* (2006.01)
  *H04W 12/06* (2009.01)

(52) U.S. Cl.
  CPC ... *H04M 3/42008* (2013.01); *H04M 3/42042* (2013.01); *H04W 12/06* (2013.01)

(58) Field of Classification Search
  CPC ...... H04M 3/42008; H04M 3/54; H04M 7/12; H04Q 3/0029; H04W 12/02; H04W 4/023; H04W 88/02
  USPC .......................................................... 455/411
  See application file for complete search history.

(56) References Cited

U.S. PATENT DOCUMENTS

| | | | | |
|---|---|---|---|---|
| 2001/0036259 | A1* | 11/2001 | Larger | H04M 3/42008 379/211.02 |
| 2003/0220976 | A1* | 11/2003 | Malik | H04L 51/04 709/206 |
| 2006/0227803 | A1* | 10/2006 | Malik | H04L 51/04 370/461 |
| 2011/0159861 | A1* | 6/2011 | Pratt | H04L 63/0407 455/417 |
| 2015/0026818 | A1* | 1/2015 | Lee | H04M 3/42008 726/26 |
| 2017/0099376 | A1* | 4/2017 | Agrawal | H04M 1/274533 |

* cited by examiner

*Primary Examiner* — Timothy Pham
(74) *Attorney, Agent, or Firm* — Lindauer Law, PLLC

(57) ABSTRACT

A system for sharing and presenting temporary contact information associated with a service personnel. When a user generates an order request, the system generates temporary data indicative of a contact name and a phone number associated with the service personnel. The system sends the temporary data to a media device of the user. The media device stores the temporary data in a secure storage and receives a communication from a service media device associated with the service personnel. The media device presents at least the contact name responsive to the communication. The media device after completion of the communication prevents access to the temporary data stored on the media device.

20 Claims, 9 Drawing Sheets

SYSTEM TO SHARE AND PRESENT TEMPORARY CONTACT INFORMATION

BACKGROUND

Mobile devices have become a prevalent means by which majorities of people worldwide have come to communicate. Many mobile devices include a large database of contacts.

Figure 1:
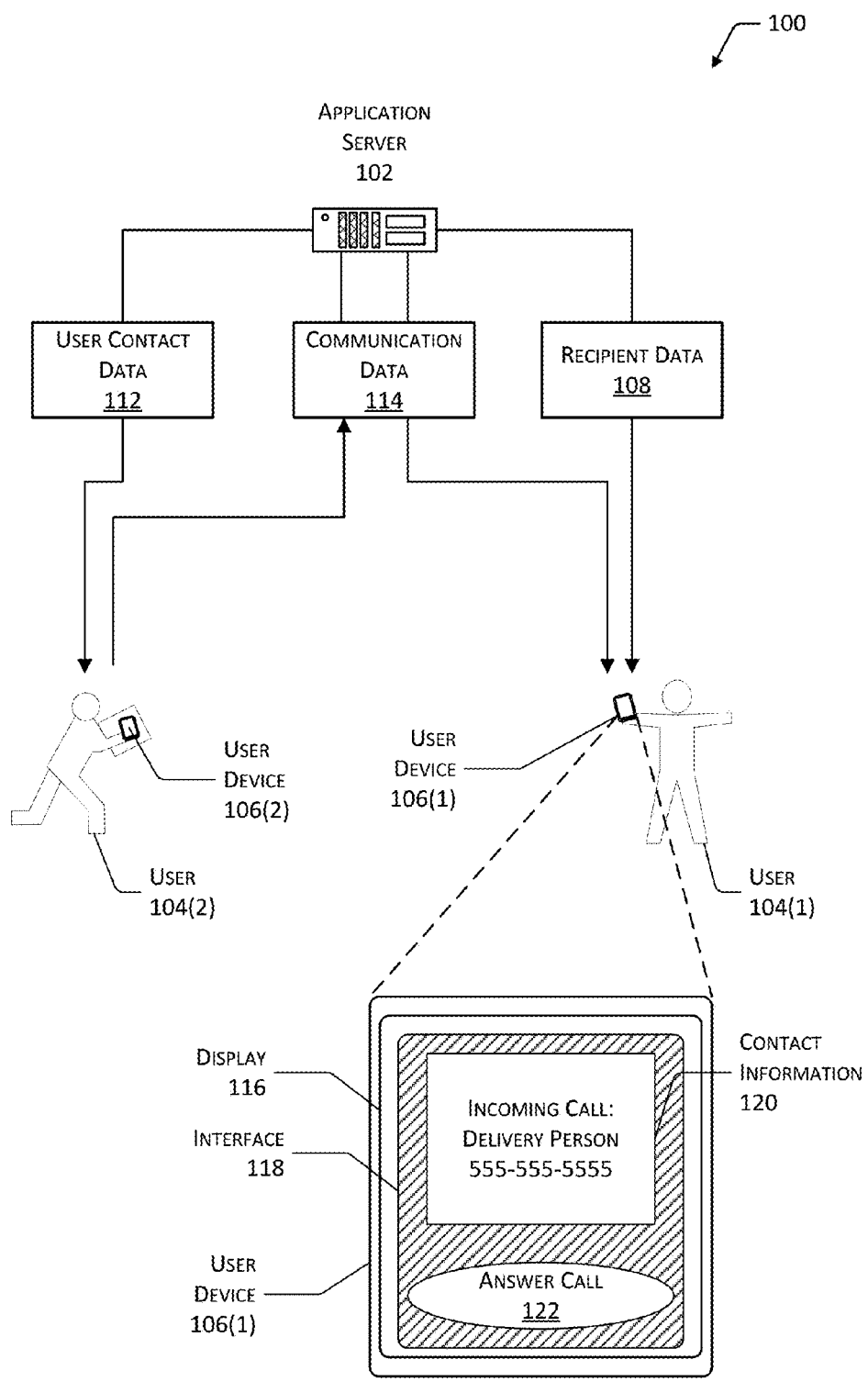
FIG. 1 is a schematic of a system for sharing and presenting temporary identification information.

Certain implementations and embodiments will now be described more fully described below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Application services provide users the ability to place orders for items, such as, home items, garden items, tools, sports and outdoor items, beauty, health and grocery items, automotive and industrial items, electronics and computer items, toys, and so forth. For example, a user may open a mobile shopping application as part of an immediate delivery network (e.g., one-hour, two-hour, "instant delivery", and so forth) on their mobile device and place an order for a child's toy. Traditionally, the user would receive a phone call from a service personnel indicating that the service personnel have arrived with the child's toy. However, the contact information presented to the user traditionally appears as unknown, or is an unknown number to the user. Many users traditionally ignore phone calls when the contact information is listed as unknown or the phone number is unknown to the user, or the users may configure their mobile devices to block phone calls from unknown users. In these instances, the user may miss the delivery of the item ordered.

This disclosure describes systems and methods for sharing and presenting temporary contact information associated with the service personnel. The temporary contact information may include a contact name and a phone number associated with the contact name. The temporary contact information may also include one or more parameters indicative of scenarios to remove the contact information, and so forth. Once an order has been placed a service may send the temporary contact information to a mobile device. The service may send the temporary contact information as evanescent data or temporary data indicative of the temporary contact information. In addition, the service may send retention data indicative of parameters to control access to the evanescent data. The parameters may include one or more of, phone call information indicative of a communication from the service personnel, text information indicative of a communication from the service personnel, time information indicative of an expiration of a period of time, or a combination thereof. For example, the parameter includes phone call information. In this example, the mobile device may receive a phone call from the service personnel indicating that the service personnel are here to deliver the user's order. The mobile device, in one implementation, upon receiving the phone call may provide access to the service personnel's contact information. In this implementation, by providing access to the service personnel's contact information the mobile device may present at least the name of the service personnel. The mobile device, in another implementation, upon completion of the communication may prevent the user access to the service personnel's contact information.

The mobile device may store the evanescent data and the retention data in a secure storage of the mobile device. The secure storage may comprise one or more dedicated memory devices, or a portion of shared system memory of the mobile device. The secure storage of the memory of the mobile device may be encrypted. By storing at least the evanescent data in the secure storage, data security of the evanescent data is improved. For example, unapproved access to the evanescent data may be reduced or eliminated, maintaining confidentiality of the evanescent data. In some implementations, the secure storage and other techniques may be used to safeguard the evanescent data during various processing states, such as during processing, transfer along a data bus, and so forth. Use of the secure storage may facilitate compliance with legal, insurance, or industry restrictions on the handling and use of data.

The mobile device may receive an incoming call from the service personnel and present at least the name of the service personnel associated with the phone number. For example, the name of the service personnel may be Delivery Person. The mobile device may present to the user "Incoming Call: Delivery Person."

The mobile device after the phone call has been completed may determine that a period of time to retain the evanescent data as specified by the retention data has expired. For example, the period of time to retain the evanescent data may be one (1) day after receiving the evanescent data. The mobile device after one (1) day has passed may prevent the user from accessing the contact information associated with the evanescent data. For example, the mobile device may delete the evanescent data from the mobile device. By only providing the contact name of the service personnel, this provides a better user experience while keeping the contact information of the service personnel private. The user's experience is improved as the user does not need to guess if a call is from an unknown phone number. In addition the user's experience is improved as the user does not need to guess if a call is somehow related to the recent order. The service personnel's experience is also improved as the contact information, specifically the phone number is no longer needed to be exposed to other users.

Illustrative System

FIG. 1 illustrates a schematic of a system 100 for sharing and presenting temporary identification information. An application server 102 may be configured to send recipient data 108 to a user device 106(1) associated with a user 104(1). The user device 106(1) and user device 106(2) may be a tablet, smart phone, media player, eBook reader device, computer-based tool, laptop computer, input accessory device, television, set top box, headless device, network-accessible audio device with a microphone, and so forth. In one implementation, the recipient data 108 may include evanescent data or temporary data. The evanescent data may be indicative of contact information associated with user device 106(2) of user 104(2). The evanescent data may also include an image of the order. The image may be a standard image provided by the manufacturer of the item or the image may be of the item and the user 104(2). For example, the user 104(2) or another user may take a picture of the item and the user 104(2) together. In this example, the picture may be the user 104(2) holding the item about to be delivered. In one implementation, the user 104(2) may be service personnel who deliver an order to the user 104(1). In another implementation, the user 104(2) may be service personnel associated with a transportation service that provides transport for hire for the user 104(1) to a destination specified by the user 104(1). In yet another implementation, the user 104(2) may be an installation technician, repair person, or other service provider. The contact information may include a contact name of the user 104(2) and a phone number associated with the user device 106(2). In another implementation, the contact information may include an image of the user 104(2) or contact name, a company logo associated with a company that the user 104(2) is associated with, a company name of the company that the user 104(2) is associated with, authentication codes, and so forth.

In another implementation, the recipient data 108 may include retention data indicative of parameters to control access to the recipient data 108. The retention data may be time to live (TTL) data. The retention data may be sent separate from the evanescent data, sent at the same time, or may be included in the evanescent data. In one implementation, the retention data indicative of parameters to control access to the recipient data 108 may include phone call information indicative of a communication from the user device 106(2). For example, the user device 106(1) may receive a phone call from the user device 106(2) indicating that the user 104(2) is about to deliver the user 104(1) order. In one implementation, the user device 106(1) upon receipt of the phone call may enable the user device 106(1) to access the contact information associated with the phone call. By providing access to the contact information the user device 106(1) may be configured to present at least the contact name of the user 104(2).

In another implementation, the user device 106(1) upon completion of the phone call may prevent the user 104(1) access to the contact information. The user device 106(1) may be configured that after a period of time from completion of the phone call may prevent the user 104(1) access to the contact information. For example, the period of time may be two (2) hours after the competition of the phone call, which then the user device 106(1) prevents the user 104(1) access to the contact information. Controlling the user's 104(1) ability to access the contact information may include permitting the user device 106(1) to access the recipient data 108, permitting the user device 106(1) to decrypt and access the recipient data 108, deleting the recipient data 108, preventing the user device 106(1) to send a phone call to the phone number associated with the user device 106(2), overwrite the recipient data 108 with general data indicative of a service provider name and a general phone number, marking the recipient data 108 as not being usable, setting a pointer or memory reference in a datastore of the user device 106(1) to a different memory location, copying over the recipient data 108 with general data indicative of a service provider name and a general phone number, removing decryption keys, or a combination thereof.

In another implementation, the retention data indicative of parameters to control access to the recipient data 108 may include text information indicative of a communication from the user device 106(2) to the user device 106(1). For example, the user device 106(1) may receive a text message from the user device 106(2) indicating that the user 104(2) is about to deliver the user 104(1) order. In one implementation, the user device 106(1) upon receipt of the text message may enable the user device 106(1) to access the contact information associated with the text message and present at least a portion of the contact information to the user 104(1). In another implementation, the user device 106(1) upon receipt of the text message may prevent the user 104(1) access to the contact information. The user device 106(1) may be configured that upon determining that the user 104(1) has accessed the text message may prevent the user 104(1) access to the contact information. In yet another implementation, the user device 106(1) after a period of time from receipt or access to the text message may prevent the user 104(1) access to the contact information. For example, the period of time may be two (2) hours after the receipt or access of the text message, which then the user device 106(1) prevents the user 104(1) access to the contact information. Controlling the user's 104(1) ability to access the contact information may include permitting the user device 106(1) to access the recipient data 108, permitting the user device 106(1) to decrypt and access the recipient data 108, deleting the recipient data 108, preventing the user device 106(1) to send a phone call to the phone number associated with the user device 106(2), overwrite the recipient data with general data indicative of a service provider name and a general phone number, marking the recipient data 108 as not being usable, setting a pointer or memory reference in a datastore of the user device 106(1) to a different memory location, copying over the recipient data 108 with general data indicative of a service provider name and a general phone number, removing decryption keys, or a combination thereof.

In yet another implementation, the retention data indicative of parameters to control access to the recipient data 108 may include time information indicative of an expiration of a period of time. For example, the period of time may be two (2) hours after receipt of the recipient data 108. In this example, regardless of whether the user device 106(1) receives a communication from the user device 106(2), the user device 106(1) may prevent the user 104(1) access to the contact information. In another example, the period of time may be days, weeks or months long, such as two (2) days, one (1) week, or one (1) month. In this example, after the user device 106(1) determines that the period of time has expired, the user device 106(1) may prevent the user 104(1) access to the contact information. Controlling the user's 104(1) ability to access the contact information may include permitting the user device 106(1) to access the recipient data 108, permitting the user device 106(1) to decrypt and access the recipient data 108, deleting the recipient data 108, preventing the user device 106(1) to send a phone call to the phone number associated with the user device 106(2), overwrite the recipient data with general data indicative of a service provider name and a general phone number, marking the recipient data 108 as not being usable, setting a pointer or memory reference in a datastore of the user device 106(1) to a different memory location, copying over the recipient data 108 with general data indicative of a service provider name and a general phone number, removing decryption keys, or a combination thereof.

In other implementations, the recipient data 108 may be stored in a secure storage of the user device 106(1). By storing at least the recipient data 108 in the secure storage, data security of the recipient data 108 is improved. For example, unapproved access to the recipient data 108 may be reduced or eliminated, maintaining confidentiality of the recipient data 108.

The recipient data 108 may be obfuscated or encrypted by the application server 102. The application server 102 may encrypt the recipient data 108 by using a public key associated with the user device 106(1). The user device 106(1) upon receiving the encrypted recipient data 108 may store the recipient data 108 in the secure storage of the user device 106(1). The user device 106(1) may decrypt the encrypted recipient data 108 by using a private key stored on the user device 106(1). For example, the user device 106(1) may decrypt the recipient data 108 using the private key when the user device 106(1) accesses the recipient data 108. In other implementations, the recipient data 108 may be encrypted by the application server 102 using a symmetric-key scheme. In this implementation, the encryption and decryption keys are the same. The user device 106(1) may have the decryption key already stored on the user device 106(1), or the user device 106(1) may receive the decryption key from the application server 102 via a different channel than the channel used to send the recipient data 108. For example, if the recipient data 108 is sent via the internet then the decryption key may be sent via short messaging service (SMS). In other implementations, the sending and receiving of the recipient data 108 between the various devices and servers may be encrypted or otherwise secured. For example, such encryption may employ one or more public or private cryptographic keys, ciphers, digital certificates, or other credentials supported by a security protocol such as any version of the Secure Sockets Layer (SSL) or the Transport Layer Security (TLS) protocol.

The application server 102 may be configured to send user contact data 112 to the user device 106(2). In one implementation, the user contact data 112 may include evanescent data or temporary data. The evanescent data may be indicative of contact information associated with user device 106(1) of user 104(1). The contact information may include a contact name of the user 104(1) and a phone number associated with the user device 106(1). In another implementation, the contact information may include a photograph of the user 104(1), an address of a pick-up or drop-off point, an address associated with the user 104(1), and so forth.

In another implementation, the user contact data 112 may be encrypted by the application server 102 using a public key associated with the user device 106(2). The user device 106(2) upon receiving the encrypted recipient data 108 may store the user contact data 112 in the secure storage of the user device 106(2). By storing at least the user contact data 112 in the secure storage, data security of the user contact data 112 is improved. For example, unapproved access to the user contact data 112 may be reduced or eliminated, maintaining confidentiality of the user contact data 112.

The user device 106(2) may decrypt the encrypted user contact data 112 by using a private key stored on the user device 106(1). For example, the user device 106(2) may decrypt the user contact data 112 using the private key when the user device 106(2) accesses the user contact data 112 to send a communication to the user device 106(1). In other implementations, the sending and receiving of the user contact data 112 between the various devices and servers may be encrypted or otherwise secured. For example, such encryption may employ one or more public or private cryptographic keys, ciphers, digital certificates, or other credentials supported by a security protocol such as any version of the SSL or the TLS protocols.

In another implementation, the user contact data 112 may include retention data indicative of parameters to control access to the user contact data 112. The retention data may be sent separate from the evanescent data, sent at the same time, or the retention data may be included in the evanescent data. In one implementation, the retention data indicative of parameters to control access to the user contact data 112 may include phone call information indicative of a communication with the user device 106(1). For example, the user device 106(2) may send communication data 114 via the application server 102 to the user device 106(1). The user device 106(2) upon determining that the user device 106(1) has accepted the phone call or upon completion of the phone call may prevent the user 104(2) access to the contact information. In another example, the user device 106(2) prior to sending the communication data 114 may be configured to decrypt the user contact data 112 stored in the secured storage of the user device 106(2). After the user device 106(2) has decrypted the user contact data 112, the user device 106(2) may be configured to generate and send the communication data 114 to the user device 106(1). In another implementation, the user device 106(2) after a period of time from completion of the phone call may prevent the user 104(2) access to the contact information. For example, the period of time may be two (2) hours after the competition of the phone call, which then the user device 106(2) prevents the user 104(2) access to the contact information. Controlling the user's 104(2) ability to access the contact information may include permitting the user device 106(2) to access the user contact data 112, permitting the user device 106(2) to decrypt and access the user contact data 112, deleting the user contact data 112, preventing the user device 106(2) to send a phone call to the phone number associated with the user device 106(1), overwrite the user contact data 112 with general data indicative of an unknown name and unknown or fake phone number, marking the user contact data 112 as being unusable, setting a pointer or memory reference in a datastore of the user device 106(2) to a different memory location, copying over the user contact data 112 with general data indicative of an unknown name and unknown or fake phone number, removing decryption keys, or a combination thereof.

In another implementation, the retention data indicative of parameters to control access to the user contact data 112 may include text information indicative of a communication from the user device 106(2) to the user device 106(1). For example, the user device 106(2) may send the communication data 114 via the application server 102 to the user device 106(1) by way of a text message. The user device 106(2) upon determining that the user device 106(1) has received or accessed the text message may prevent the user 104(2) access to the contact information. In another implementation, the user device 106(2) after a period of time from the receipt or access of the text message may prevent the user 104(2) access to the contact information. For example, the period of time may be two (2) hours after the receipt or access of the text message, which then the user device 106(2) prevents the user 104(2) access to the contact information. Controlling the user's 104(2) ability to access the contact information may include permitting the user device 106(2) to access the user contact data 112, permitting the user device 106(2) to decrypt and access the user contact data 112, deleting the user contact data 112, preventing the user device 106(2) to send a phone call to the phone number associated with the user device 106(1), overwrite the user contact data 112 with general data indicative of an unknown name and unknown or fake phone number, marking the user contact data 112 as being unusable, setting a pointer or memory reference in a datastore of the user device 106(2) to a different memory location, copying over the user contact data 112 with general data indicative of an unknown name and unknown or fake phone number, removing decryption keys, or a combination thereof.

In yet another implementation, the retention data indicative of parameters to control access to the user contact data 112 may include time information indicative of an expiration of a period of time. For example, the period of time may be two (2) hours after receipt of the user contact data 112. In this example, regardless of whether the user device 106(2) sends a communication to the user device 106(1), the user device 106(2) may prevent the user 104(2) access to the contact information. In another example, the period of time may be days, weeks or months long, such as two (2) days, one (1) week, or one (1) month. In this example, after the user device 106(2) determines that the period of time has expired, the user device 106(2) may prevent the user 104(2) access to the contact information. Controlling the user's 104(2) ability to access the contact information may include permitting the user device 106(2) to access the user contact data 112, permitting the user device 106(2) to decrypt and access the user contact data 112, deleting the user contact data 112, preventing the user device 106(2) to send a phone call to the phone number associated with the user device 106(1), overwrite the user contact data 112 with general data indicative of an unknown name and unknown or fake phone number, marking the user contact data 112 as being unusable, setting a pointer or memory reference in a datastore of the user device 106(2) to a different memory location, copying over the user contact data 112 with general data indicative of an unknown name and unknown or fake phone number, removing decryption keys, or a combination thereof.

In other implementations, the retention data indicative of parameters to control access to the user contact data 112 may include order information indicative of completing an order. The completing of an order may include delivery item(s) that the user 104(1) order or another user ordered for the user 104(1), picking up or dropping off the user 104(1) and so forth. For example, the user 104(1) may place an order for a child's toy. The user 104(2) may deliver the child's toy to the user 104(1). Prior to the delivery the user device 106(2) may send the communication data 114 to the user device 106(1), as described above. After the user 104(2) has delivered the child's toy to the user 104(1), the user device 106(2) may provide a notification to the application server 102 that the order has been completed. The user device 106(2) may prevent the user 104(2) access to the contact information. Controlling the user's 104(2) ability to access the contact information may include deleting the user contact data 112, preventing the user device 106(2) to send a phone call to the phone number associated with the user device 106(1), overwrite the user contact data 112 with general data indicative of an unknown name and unknown or fake phone number, marking the user contact data 112 as being unusable, setting a pointer or memory reference in a datastore of the user device 106(2) to a different memory location, copying over the user contact data 112 with general data indicative of an unknown name and unknown or fake phone number, removing decryption keys, or a combination thereof.

Referring back to FIG. 1, the user device 106(2) may send the communication data 114 indicative of a communication, via the application server 102 to the user device 106(1). The communication may be a phone call, a video call, a text message, and so forth. The user device 106(1) may receive the communication and be configured to present an interface 118 via a display 116. The interface 118 may be configured to depict contact information 120 and an answer call 122. In one implementation, the contact information 120 may include the contact name of the user 104(2) and a phone number associated with the user device 106(2). The phone number may be the user 104(2) actual phone number associated with the user device 106(2) or a general phone number associated with a company that the user 104(2) works for or is a contract worker. For example, as depicted in FIG. 1, the interface 118 may be configured to display "Incoming Call: Delivery Driver Bob 555-555-5555" and the answer call 122. In another implementation, the contact information 120 may include a company name associated with the user device 106(2) or the user 104(2), an image of the user 104(2) or contact name, an image of a company logo associated with a company name that the user 104(2) works for or is a contract worker, an authentication code that authenticates the user device 106(2), the user 104(2) or both the user device 106(2) and the user 104(2), or a combination thereof.

The user device 106(1) may be configured to receive a user input from the user 104(1). The user input may be indicative of accepting the communication from the user device 106(2). In one implementation, the user input may be associated with the user 104(1) touching the display 116 of the user device 106(1) to indicate an acceptance of the communication. In another implementation, the user input may be associated with a phrase. For example, the phrase may be "answer", which may cause the user device 106(1) to accept the communication between the user device 106(1) and the user device 106(2).

Figure 2:
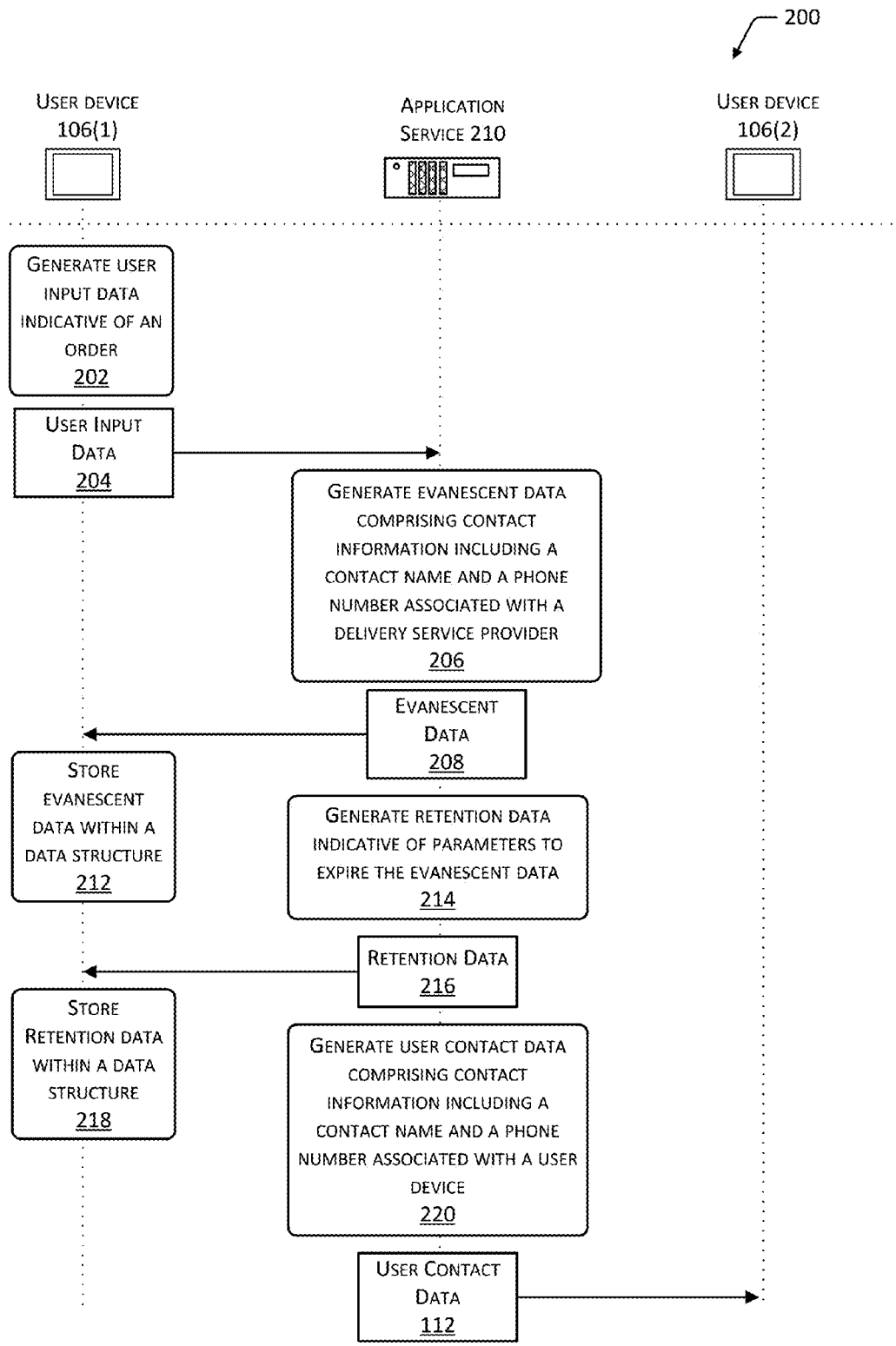
FIGS. 2 and 3 depict a flow diagram illustrating a process of sharing and presenting temporary identification information.
Figure 3:
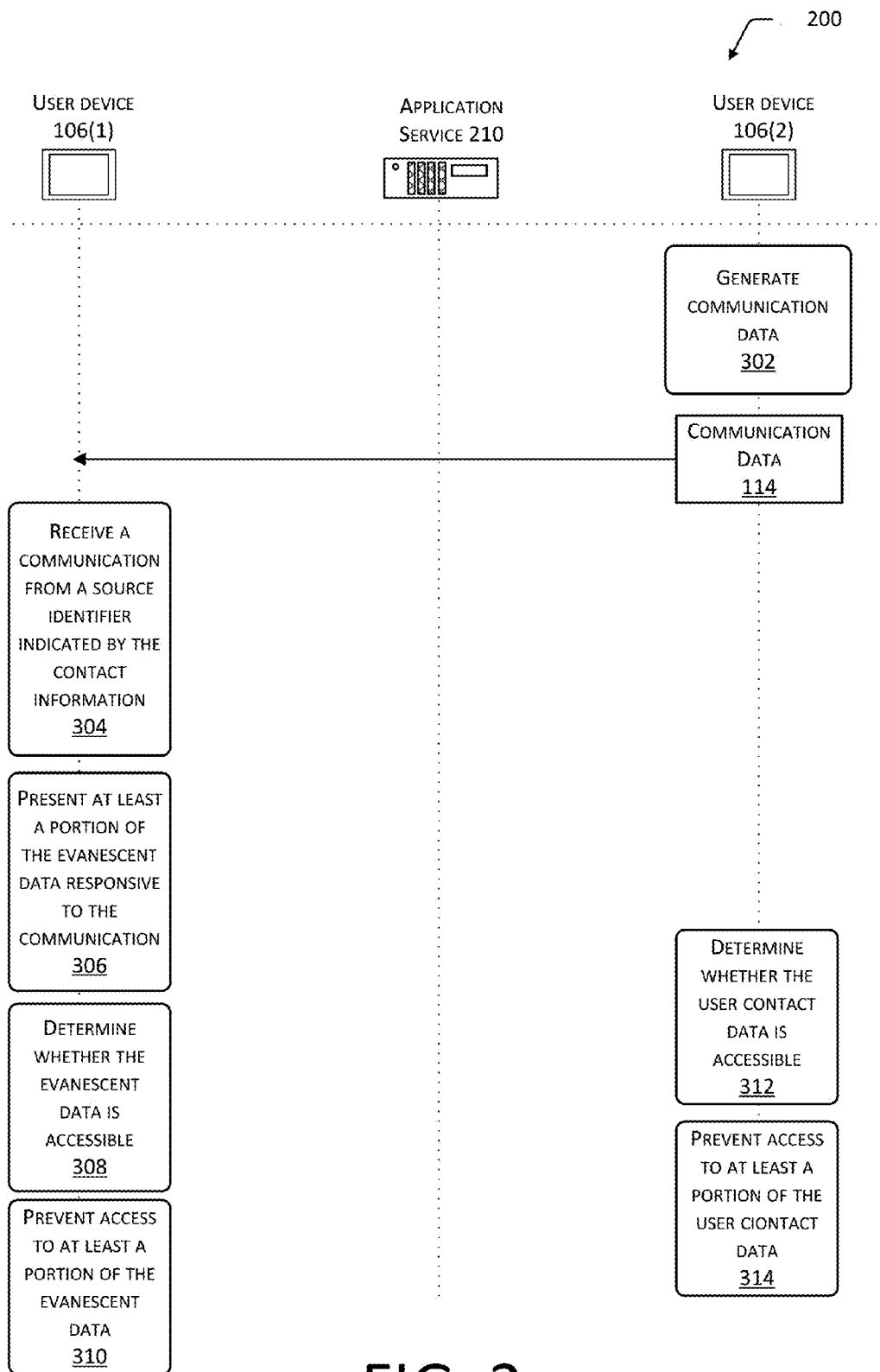

FIGS. 2 and 3 depict a flow diagram 200 illustrating a process of sharing and presenting temporary identification information. Although the process 200 is described with reference to the flowchart illustrated in FIGS. 2 and 3 many other methods performing the acts associated with the process 200 may be used. For example, the order of the steps may be changed, some of the steps described may be optional, and additional steps may be included. In these diagrams, time increases from top to bottom, such that events occurring at the bottom of the page may occur later than those events depicted at the top of the page.

At 202, the user device 106(1) generates user input data 204 indicative of an order. In one implementation, the order may be for item(s), such as, home items, garden items, tools, sports and outdoor items, beauty, health and grocery items, automotive and industrial items, electronics and computer items, toys, and so forth. For example, the user 104(1) may generate an order for a child's toy, which is to be delivered to the user's 104(1) home address. In another implementation, the order may be for a service(s), such as, food delivery, transportation service, and so forth. For example, the user 104(1) may generate an order for a transportation service, such as a taxi, to pick up the user 104(1) at one location, such as the user's 104(1) home address, and have the transportation service drive the user to a second location, such as, an airport, bar, sporting event, work, a home of another user, and so forth. In another example, the user 104(1) may generate an order for a television that includes an installation service or the user may generate a second order for an installation service of the television. In this example, there may be multiple users 104(2). One of the 104(2) users may be a service provider that delivers the television and the second one of the 104(2) users may be an installation technician. In a similar example, the user 104(2) may be a service provider and an installation technician.

The user device 106(1) may be configured to send the user input data 204 to an application service 210.

At 206, the application service 210 may be configured to generate evanescent data 208. In one implementation, the evanescent data 208 may be temporary data that includes a contact name and a phone number associated with a service provider. The contact name of the service provider may be the user 104(2). The phone number may be associated with the user device 106(2). In another implementation, the evanescent data 208 may include an image of service personnel or the user 104(2) or the contact name, a company logo associated with a company that the service personnel or the user 104(2) is associated with, a company name of the company that the service provider or the user 104(2) is associated with, authentication codes, and so forth. In yet another implementation, the evanescent data 208 includes general data indicative of a service provider name and a general phone number. For example, the service provider name may be the company that the service personnel or the user 104(2) works for or is contracted to work for. The general phone number may be a phone number associated with the company, such as, the main phone number for the company. In other implementations, the evanescent data 208 may include an indication of the order. The indication of the order may be an image of the order. The image may be a standard image provided by the manufacturer of the item or the image may be of the item and the user 104(2). For example, the user 104(2) or another user may take a picture of the item and the user 104(2) together. In this example, the picture may be the user 104(2) holding the item about to be delivered. The image of the user 104(2) and the item may be the image of the user 104(2), as described above.

The evanescent data 208 may also include a description of the item ordered. The description may be entered by the user 104(2) who is delivering the item, another user 104 or human operator, or an automated system. The application service 210 may generate the description based on the detailed description provided by a manufacturer of the item or the detailed description provided by the retailer selling the item. The application service 210 may also generate the description based on topic modeling. For example, the application service may perform topic modeling on the title of the item, detailed page, webpage that was selling the item, bullet points of key selling features, which may have been provided by a manufacturer of the item or retailer selling the item, customer reviews of the item, and so forth. The application service 210 when performing topic modeling may run a series of algorithms for discovering main themes that pervade a large collection of documents. The application service 210 may organize the collection according to the discovered themes. A particular topic modeling approach that the application service 210 may use is Latent Dirichlet Allocation (LDA). The application service 210, when using LDA, may make an assumption that there exists a finite number of topics. A topic may be defined as a distribution over a fixed vocabulary. These topics may be specified before data has been generated. For each document in the collection, the application service 210 may assume that the words are generated in a two-stage process. The first stage may include the application service 210 (*a*) randomly choosing a distribution over topics or (b) randomly choosing a word from a corresponding distribution over the vocabulary. The application service 210 may generate a statistical model that reflects an intuition that documents may exhibit multiple topics. Each of the documents exhibits the topics in different proportion. The second stage may include the application service 210 to select a topic based on a per-document distribution over the topics and then draw each word in the document from the selected topic.

The evanescent data 208 may be encrypted by the application service 210 using a public key associated with the user device 106(1). The user device 106(1) may be configured to store the encrypted evanescent data 208 in the secure storage of the user device 106(1). The user device 106(1) may be configured to decrypt the encrypted evanescent data 208 by using a private key stored on the user device 106(1). In other implementations, the evanescent data 208 may be encrypted by the application service 210 using a symmetric-key scheme. In this implementation, the encryption and decryption keys are the same. The user device 106(1) may have the decryption key already stored on the user device 106(1), or the user device 106(1) may receive the decryption key from the application service 210 via a different channel than the channel used to send the evanescent data 208. For example, if the evanescent data 208 is sent via the internet then the decryption key may be sent via electronic mail (email). In other implementations, the sending and receiving of the evanescent data 208 between the various devices and servers may be encrypted or otherwise secured. For example, such encryption may employ one or more public or private cryptographic keys, ciphers, digital certificates, or other credentials supported by a security protocol such as any version of the SSL or the TLS protocol.

The application service 210 may be configured to send the evanescent data 208 to the user device 106(1). In one implementation, the application service 210 may be configured to send the evanescent data 108 just before a scheduled delivery time. For example, the application service 210 may send the evanescent data 208 an hour before the scheduled delivery. In another embodiment, the application service 210 may be configured to send a portion of the evanescent data 208 to the user device 106(1) based on a certain distance from a destination point. The destination point may be where the user 104(1) is to receive the ordered item or to meet the user 104(2). The certain distance may be, for example, 10 feet away from the destination point. In this example, the application service 210 may determine that the user device 106(1) is within 10 feet from the destination point. The application service 210 upon the determination that the user device 106(1) is within the certain distance, may send the portion of the evanescent data 208 to the user device 106(2). For example, the first portion may be data indicative of the contact name associated with the user device 106(2). The application service 210 may also be configured to determine a second location of the user device 106(1) and send a second portion of the evanescent data 208. For example, the application service 210 may determine that the user device 106(1) is within a certain distance from the destination point. The destination point may be where the user 104(1) is to receive the ordered item or to meet the user 104(2). The certain distance may be, for example, 2 feet away from the destination point. In this example, the application service 210 upon the determination that the user device 106(1) is within the certain distance, may send the second portion of the evanescent data 208 to the user device 106(2). For example, the second portion may be data indicative of an image of the user 104(2).

At 212, the user device 106(1) may be configured to store the evanescent data 208 within a data structure. In one implementation, the data structure may include a secure storage for storing the evanescent data 208. In another implementation, the user device 106(1) may be configured to have a first data structure and a second data structure, where the second data structure is a secure data structure for storing at least a portion of the evanescent data 208. The user device 106(1), in one implementation, may generate a contact list that includes public contact fields and hidden contact fields. The public contact fields and the hidden contact fields may be stored in the secure storage. The public contact fields may include contact name fields associated with at least the contact name. The public contact fields may also include fields to store the image of service personnel or the user 104(2) or the contact name, the company logo associated with the company that the service personnel or the user 104(2) is associated with, the company name of the company that the service provider or the user 104(2) is associated with, authentication codes, the general phone number associated with the company, and so forth. The public contact fields may be configured to be presented on the display 116 of the user device 106(1). One or more of the public contact fields discussed above, may be encrypted. The one or more public contact fields may be encrypted using a public key-private key scheme. The application service 210 may encrypt the data associated with public contact fields with a public key. The public key may be associated with the user device 106(1). The user device 106(1) upon accessing the data in the public contact field may use the private key stored on the user device 106(1) to decrypt the data. In other implementations, the data stored in the one or more public contact fields may be encrypted by the application service 210 using a symmetric-key scheme. In this implementation, the encryption and decryption keys are the same. The user device 106(1) may have the decryption key already stored on the user device 106(1), or the user device 106(1) may receive the decryption key from the application service 210 via a different channel than the channel used to send the data associated with the one or more public contact fields. For example, if the data is sent via the internet then the decryption key may be sent via SMS.

The hidden contact fields may include a phone number field associated with at least the phone number. The hidden contact fields may be configured to omit the presentation of the phone number located in the hidden contact field. The hidden contact fields may be encrypted. The hidden contact fields may be encrypted using a public-private key scheme. The application service 210 may encrypt the data associated with hidden contact fields with a public key. The public key may be associated with the user device 106(1). The user device 106(1) upon accessing the data in the hidden contact fields may use the private key stored on the user device 106(1) to decrypt the data. In other implementations, the data stored in the hidden contact fields may be encrypted by the application service 210 using a symmetric-key scheme. In this implementation, the encryption and decryption keys are the same. The user device 106(1) may have the decryption key already stored on the user device 106(1), or the user device 106(1) may receive the decryption key from the application service 210 via a different channel than the channel used to send the data associated with the hidden contact fields. For example, if the data is sent via SMS then the decryption key may be sent via the internet.

In another implementation, the application service 210 may be configured to send a notification request to access the contact list on the user device 106(1) to store the evanescent data 208. The user device 106(1) may be configured to receive a user input to allow the application service 210 to access the contact list and send the user input to the application service 210. The application service 210 or the user device 106(1) may be configured to generate a contact location to store the evanescent data 208. The contact location may include a public contact field and a hidden contact field as described above.

At 214, the application service 210 may be configured to generate retention data 216 indicative of parameters to control access to the evanescent data 208. The retention data 216 may be time to live (TTL) data. In one implementation, the retention data 216 indicative of parameters to control access to the evanescent data 208 may include phone call information indicative of a communication from the user device 106(2). For example, the user device 106(1) may receive a phone call from the user device 106(2) indicating that the user 104(2) is about to deliver the user 104(1) order. In another example, the user device 106(1) upon receipt of the phone call may be enabled to access the contact information associated with the phone call. By providing access the user device 106(1) may be configured to present at least the contact name. In one implementation, the user device 106(1) upon completion of the phone call may prevent the user 104(1) access to the contact information. In another implementation, the user device 106(1) after a period of time from completion of the phone call may prevent the user 104(1) access to the contact information. For example, the period of time may be two (2) hours after the competition of the phone call, which then the user device 106(1) prevents the user 104(1) access to the contact information. Controlling the user's 104(1) ability to access the contact information may include permitting the user device 106(1) to access the evanescent data 208, permitting the user device 106(1) to decrypt and access the evanescent data 208, deleting the recipient data 108, preventing the user device 106(1) to send a phone call to the phone number associated with the user device 106(2), overwrite the recipient data with general data indicative of a service provider name and a general phone number, removing decryption keys, or a combination thereof.

In another implementation, the retention data 216 indicative of parameters to control access to the evanescent data 208 may include text information indicative of a communication from the user device 106(2) to the user device 106(1). For example, the user device 106(1) may receive a text message from the user device 106(2) indicating that the user 104(2) is about to deliver the user 104(1) order. In one implementation, the user device 106(1) upon receipt of the text message may prevent the user 104(1) access to the contact information. In another implementation, the user device 106(1) upon determining that the user 104(1) has accessed the text message may prevent the user 104(1) access to the contact information. In yet another implementation, the user device 106(1) after a period of time from receipt or access to the text message may prevent the user 104(1) access to the contact information. For example, the period of time may be two (2) hours after the receipt or access of the text message, which then the user device 106(1) prevents the user 104(1) access to the contact information. In other implementations, the user device 106(1) upon receipt of the text message may be enabled to access the contact information and present at least a portion of the contact information. Controlling the user's 104(1) ability to access the contact information may include permitting the user device 106(1) to access the evanescent data 208, permitting the user device 106(1) to decrypt and access the evanescent data 208, deleting the evanescent data 208, preventing the user device 106(1) to send a phone call to the phone number associated with the user device 106(2), overwrite the evanescent data 208 with general data indicative of a service provider name and a general phone number, removing decryption keys, or a combination thereof.

In yet another implementation, the retention data 216 indicative of parameters to control access to the evanescent data 208 may include time information indicative of an expiration of a period of time. For example, the period of time may be two (2) hours after receipt of the recipient data 108. In this example, regardless of whether the user device 106(1) receives a communication from the user device 106(2), the user device 106(1) may prevent the user 104(1) access to the contact information. In another example, the period of time may be days, weeks or months long, such as two (2) days, one (1) week, or one (1) month. In this example, after the user device 106(1) determines that the period of time has expired, the user device 106(1) may prevent the user 104(1) access to the contact information. Preventing the user 104(1) the ability to access the contact information may include deleting the recipient data 108, preventing the user device 106(1) to send a phone call to the phone number associated with the user device 106(2), overwrite the recipient data with general data indicative of a service provider name and a general phone number, removing decryption keys, or a combination thereof. The application service 210 may be configured to send the retention data 216 to the user device 106(1). The retention data 216 may be sent separate from the evanescent data 208, sent at the same time, or the retention data 216 may be included in the evanescent data 208.

At 218, the user device 106(1) may store the retention data 216 within a data structure. In one implementation, the retention data 216 is stored in a separate data structure from the evanescent data 208. In another implementation, the retention data 216 is stored with the evanescent data 208. As described above, the user device 106(1) or the application service 210 may generate a contact list that includes public contact fields and hidden contact fields. The public contact fields may include contact name fields associated with at least the contact name. The hidden contact fields may include a phone number field associated with at least the phone number. The hidden contact fields may also include one or more fields to include the retention data 216. For example, at least one of the fields may be to store phone call information indicative of a communication from the user device 106(2). In another example, at least one of the fields may be to store text information indicative of a communication from the user device 106(2) to the user device 106(1). In yet another example, at least one of the fields may be to store time information indicative of an expiration of a period of time.

At 220, the application service 210 may be configured to generate the user contact data 112. In one implementation, the user contact data 112 may be indicative of contact information associated with user device 106(1) of user 104(1). The contact information may include a contact name of the user 104(1) and a phone number associated with the user device 106(1). In another implementation, the contact information may include a photograph of the user 104(1), an address of a pick-up or drop-off point, an address associated with the user 104(1), and so forth. In other implementations, the user contact data 112 may be encrypted by the application service 210 using a public-private key scheme, a symmetric-key scheme, ciphers, digital certificates, or other credentials supported by a security protocol such as any version of the SSL or the TLS protocol, as described above.

In another implementation, the user contact data 112 may include retention data indicative of parameters to control access to the user contact data 112. The retention data may be sent separate from the user contact data 112, sent at the same time, or the retention data may be included in the user contact data 112. In one implementation, the retention data indicative of parameters to control access to the user contact data 112 may include phone call information indicative of a communication with the user device 106(1). For example, the user device 106(2) may send communication data 114 via the application server 102 to the user device 106(1). The user device 106(2) prior to sending the communication data 114 may be enabled to access the user contact data 112 and generate the communication data 114, as described above. Afterwards, the user device 106(2) may determine that the user device 106(1) has accepted the phone call or that the phone call has been completed. Upon the determination the user device 106(2) may prevent the user 104(2) access to the contact information. In another implementation, the user device 106(2) after a period of time from completion of the phone call may prevent the user 104(2) access to the contact information. For example, the period of time may be two (2) hours after the competition of the phone call, which then the user device 106(2) prevents the user 104(2) access to the contact information. Controlling the user's 104(2) ability to access the contact information may include permitting the user device 106(2) to access the user contact data 112, permitting the user device 106(2) to decrypt and access the user contact data 112, deleting the user contact data 112, preventing the user device 106(2) to send a phone call to the phone number associated with the user device 106(1), overwrite the user contact data 112 with general data indicative of an unknown name and unknown or fake phone number, removing decryption keys, or a combination thereof.

In another implementation, the retention data indicative of parameters to prevent access to the user contact data 112 may include text information indicative of a communication from the user device 106(2) to the user device 106(1). For example, the user device 106(2) may send the communication data 114 via the application server 102 to the user device 106(1) by way of a text message. The user device 106(2) prior to sending the communication data 114 may be enabled to access the user contact data 112 and generate the communication data 114, as described above. Afterwards, the user device 106(2) may determine that the user device 106(1) has received or accessed the text message and may prevent the user 104(2) access to the contact information. In another implementation, the user device 106(2) after a period of time from the receipt or access of the text message may prevent the user 104(2) access to the contact information. For example, the period of time may be two (2) hours after the receipt or access of the text message, which then the user device 106(2) prevents the user 104(2) access to the contact information. Mechanisms for controlling and preventing the user 104(2) the ability to access the contact information may be similar to those described above.

In yet another implementation, the retention data indicative of parameters to control access to the user contact data 112 may include time information indicative of an expiration of a period of time. For example, the period of time may be two (2) hours after receipt of the user contact data 112. In this example, regardless of whether the user device 106(2) sends a communication to the user device 106(1), the user device 106(2) may prevent the user 104(2) access to the contact information. In another example, the period of time may be days, weeks or months long, such as two (2) days, one (1) week, or one (1) month. In this example, after the user device 106(2) determines that the period of time has expired, the user device 106(2) may prevent the user 104(2) access to the contact information. Mechanisms for controlling and preventing the user 104(2) the ability to access the contact information may be similar to those described above.

In other implementations, the retention data indicative of parameters to control access to the user contact data 112 may include order information indicative of completing an order. The completing of an order may include delivery item(s) that the user 104(1) order or another user ordered for the user 104(1), picking up or dropping off the user 104(1) and so forth. For example, the user 104(1) may place an order for a child's toy. The user 104(2) may deliver the child's toy to the user 104(1). Prior to the delivery the user device 106(2) may send the communication data 114 to the user device 106(1), as described above. After the user 104(2) has delivered the child's toy to the user 104(1), the user device 106(2) may provide a notification to the application server 102 that the order has been completed. The user device 106(2) may prevent the user 104(2) access to the contact information. Mechanisms for controlling and preventing the user's 104(2) ability to access the contact information may be similar to those described above. The application service 210 may be configured to send the user contact data 112 to the user device 106(2). In one implementation, the application service 210 may be configured to send the user contact data 112 just before a scheduled delivery time. For example, the application service 210 may send the user contact data 112 an hour before the scheduled delivery. In another embodiment, the application service 210 may be configured to send a portion of the user contact data 112 to the user device 106(2) based on a certain distance from a destination point. The destination point may be where the user 104(2) is to deliver an ordered item or to meet the user 104(1). The certain distance may be, for example, 10 feet away from the destination point. In this example, the application service 210 may determine the user device 106(2) is within 10 feet from the destination point. The application service 210 upon the determination that the user device 106(2) is within the certain distance, may send the portion of the user contact data 112 to the user device 106(2). For example, the first portion may be data indicative of the phone number associated with the user device 106(1). The application service 210 may also be configured to determine a second location of the user device 106(2) and send a second portion of the user contact data 112. For example, the application service 210 may determine that the user device 106(2) is within a certain distance from the destination point. The destination point may be where the user 104(2) is to deliver an ordered item or to meet the user 104(1). The certain distance may be, for example, 2 feet away from the destination point. In this example, the application service 210 upon the determination that the user device 106(2) is within the certain distance, may send the second portion of the user contact data 112 to the user device 106(2). For example, the second portion may be data indicative of an image of the user's 104(1) residence.

FIG. 3 depicts the continuation of flow diagram 200 from FIG. 2. At 302, the user device 106(2) may be configured to generate the communication data 114. In one implementation, the communication data 114 may be indicative of a phone call. In another implementation, the communication data 114 may be indicative of a text message. The user device 106(2) may be configured to send the communication data 114 to the user device 106(1). As described above, the user device 106(2) may be configured to decrypt the user contact data 112. In response to decrypting the user contact data 112 the user device 106(2) may be configured to generate the communication data 114, as described above.

At 304, the user device 106(1) may be configured to receive a communication from a source identifier indicated by the contact information. The source identifier may be a phone number, messaging service handle, email address, IP address, and so forth, associated with the user device 106(2). The user device 106(1) may determine an incoming communication based on a regular expression, wildcard processing, or other comparison of the source identifier. For example, where the source identifier is a telephone number, that number includes an area code and prefix. A regular expression or wildcard may be used to provide a partial match. For example, the general phone number associated with a company that the user 104(2) works for or is a contract worker for may be 800-456-1234. Regardless of the last four digits of the phone number, the user device 106(1) may determine that the incoming communication is from the company that the user 104(2) works for or is a contract worker for. The user device 106(1) in response to this determination may be configured to at least display the company name that the user 104(2) works for or the contact name of the user 104(2). Continuing the example, based on a match of the area code and prefix that are the first six digits of the phone number, calls from 800-456-3241 or 800-456-3813 will show as being from 800-456-1234. The user device 106(1) may determine an incoming communication by matching the communication data associated with the communication with the evanescent data 208 stored on the user device 106(1).

At 306, the user device 106(1) may be configured to present at least a portion of the evanescent data 208 indicative of the contact information 120 responsive to receiving the communication. In one implementation, the user device 106(1) may be configured to present the interface 118 via the display 116. The interface 118 may be configured to depict contact information 120 and an answer call 122. In one implementation, the contact information 120 may include the contact name of the user 104(2) and a phone number associated with the user device 106(2). The phone number may be the user 104(2) actual phone number associated with the user device 106(2) or a general phone number associated with a company that the user 104(2) works for or is a contract worker for. For example, as depicted in FIG. 1, the interface 118 may be configured to display "Incoming Call: Delivery Driver Bob 555-555-5555" and the answer call 122. In another implementation, the contact information 120 may include a company name associated with the user device 106(2) or the user 104(2), an image of the user 104(2) or the contact name, an image of a company logo associated with a company name that the user 104(2) works for or is a contract worker, an authentication code that authenticates the user device 106(2), the user 104(2) or both the user device 106(2) and the user 104(2), or a combination thereof. In other implementations, as described above, the user device 106(1) may be configured to decrypt the evanescent data 208 in response to receiving the communication from a source identifier indicated by the contact information. By decrypting the evanescent data 208 stored in the secure storage, the user device 106(1) may be configured to present at least portion of the evanescent data 208 indicative of the contact information 120, as described above.

The user device 106(1) may be configured to receive a user input from the user 104(1). The user input may be indicative of accepting the communication from the user device 106(2). In one implementation, the user input may be associated with the user 104(1) touching the display 116 of the user device 106(1) to indicate an acceptance of the communication. In another implementation, the user input may be associated with a phrase. For example, the phrase may be "answer", which may cause the user device 106(1) to accept the communication between the user device 106(1) and the user device 106(2).

In another embodiment, the user device 106(1) may be configured to receive authentication data indicative of a code that authenticates the source identifier. In one implementation, the code may be a phrase, numbers, order confirmation number, a combination of letters and numbers and so forth. For example, the user device 106(1) may receive the authentication data and be configured to generate the interface 118 to depict the code via the display 116 or generated speech that says aloud to the user 104(1) the code. In this example, the code may be a phrase, such as, the user 104(1) street address "654 Acorn Drive." The user device 106(1) may display or say aloud the phrase "654 Acorn Drive." The user device 106(1) may also be configured to verify that the code matches a second code stored with the datastore 604. For example, the datastore 604 may include an authentication code column with data indicative of the code "654 Acorn Drive." The user device 106(1) upon receipt of the authentication data may look up within the datastore 604 the authentication code associated with the user 104(2) or the service personnel and verify that the code received from the user device 106(2) matches the authentication code stored in the datastore 604.

In yet another embodiment, the user device 106 may be configured to present at least a portion of the evanescent data 208 indicative of the contact information 120 based on a location or geolocation of the user device 106. The user device 106 may be configured to determine a first location or first geolocation of a device and decrypt a first portion of the contact information associated with first evanescent data based on the first location. For example, the user device 106(1) may determine that the user device 106(1) is within a certain distance from a destination point. The destination point may be where the user 104(1) is to meet the user 104(2). The certain distance may be, for example, 10 feet away from the destination point. In this example, the user device 106(1) may decrypt the portion of the evanescent data 208 indicative of the contact name of the user 104(2). In another example, the user device 106(1) may be configured to receive a decrypted portion of the evanescent data 208 when the user device 106(1) determines that the user is within a certain distance from the destination point. In this example, the threshold to receive the decrypted portion may be that the user device 106(1) may need to be within 10 feet from the destination point. Once, the user device 106(1) determines that the user device 106(1) meets or exceeds this threshold the user device 106(1) may send a notification to the application service 210 for the decrypted portion or the application service 210 may automatically send the decrypted portion. The user device 106(1) may be configured to determine a second location or second geolocation of the user device 106(1) and decrypt a second portion of the contact information associated with the second evanescent data based on the second location. For example, the user device 106(1) may determine that the user device 106(1) is within a certain distance from the destination point. The destination point may be where the user 104(1) is to meet the user 104(2). The certain distance may be, for example, 2 feet away from the destination point. In this example, the user device 106(1) may decrypt the portion of the evanescent data 208 indicative of the phone number associated with the user device 106(2). In another example, the user device 106(1) may be configured to receive a second decrypted portion of the evanescent data 208 when the user device 106(1) determines that the user is within a certain distance from the destination point. In this example, the threshold to receive the second decrypted portion may be that the user device 106(1) may need to be within 2 feet from the destination point. Once, the user device 106(1) determines that the user device 106(1) meets or exceeds this threshold the user device 106(1) may send a notification to the application service 210 for the second decrypted portion or the application service 210 may automatically send the second decrypted portion.

In other embodiments, the user device 106(1) may be configured to receive from the source identifier, first authentication data. The source identifier, in one implementation, may be the user device 106(2). In another implementation, the source identifier may be a phone number, messaging service handle, email address, IP address, and so forth, associated with the user device 106(2). The user device 106(1) may be configured to send second authentication data to the source identifier. The user device 106(1) may be configured to determine that the first authentication data and the second authentication data match within a threshold value. The user device 106(1) may be further configured to receive from the source identifier first verification data. The user device 106(1) may also be configured to send, to the source identifier, second verification data. For example, the user device 106(2) may send the first authentication data indicative of a code to the user device 106(1). The code may be a phrase, numbers, order confirmation number, a combination of letters and numbers and so forth. In this example, the code may be numbers, such as, "1234."

The user device 106(1) may be configured to determine that the code matches a second code stored with the datastore 604 as described above. The user device 106(2) may be configured to receive the second authentication data indicative of a second code from the user device 106(1). The user device 106(2) may be configured to determine that the second code matches the code stored with a datastore within the user device 106(2), as described above. The user device 106(1) may be configured to receive from the user device 106(2) the first verification data indicative that the first code and the second code match within the threshold value. The user device 106(1) may be configured to send to the user device 106(2) the second verification data indicative that the first code and the second code match within the threshold value.

The threshold value, in one implementation, may be an exact match between the codes. For example, the first code and the second code may be "1234" and if one of the codes is not exactly "1234" then the match does not fall within the threshold value. In another implementation, the threshold value may be a range within which the codes may need to match. For example, the range may be that 3 out of 4 of the characters may match. In this example, the first code provided may be "1235" and the second code provided may be "1234." The correct code, in this example is "1234," however since, 3 of the 4 characters in the first code were correct, the user device 106 may determine that the codes match within the threshold value.

At 308, the user device 106(1) may be configured to determine whether the evanescent data 208 is accessible. In one implementation the user device 106(1) determines that the evanescent data 208 is accessible based on the retention data 216. As described above, the retention data 214 may be indicative of parameters to control access to the evanescent data 208. In one implementation, the retention data 216 indicative of parameters to control access to the evanescent data 208 may include phone call information indicative of a communication from the user device 106(2). For example, the user device 106(1) may receive a phone call from the user device 106(2) indicating that the user 104(2) is about to deliver the user 104(1) order. In this example, the user device 106(1) upon receipt of the phone call may be enabled to access the stored evanescent data 208 and present at least a portion of the evanescent data 208. After the communication is complete, the user device 106(1) may determine that the evanescent data 208 has expired. In another implementation, the phone call information may include that after a period of time from completion of the phone call the evanescent data 208 has expired. For example, the period of time may be two (2) hours after the competition of the phone call, which then the user device 106(1) determines that the evanescent data 208 has expired.

In another implementation, the retention data 216 indicative of parameters to control access to the recipient data 108 may include text information indicative of the communication from the user device 106(2) to the user device 106(1). For example, the user device 106(1) may receive a text message from the user device 106(2) indicating that the user 104(2) is about to deliver the user 104(1) order. In one implementation, the user device 106(1) upon receipt of the text message may be enabled to access the stored evanescent data 208 and present at least a portion of the evanescent data 208. After the user device 106(1) has accessed the evanescent data 208, the user device 106(1) may determine that the evanescent data 208 has expired. In another implementation, the user device 106(1) upon determining that the user 104(1) has accessed the text message determines that the evanescent data 208 has expired. In yet another implementation, the user device 106(1) after a period of time from receipt or access to the text message may determine that the evanescent data 208 has expired. For example, the period of time may be two (2) hours after the receipt or access of the text message, which then the user device 106(1) determines that the evanescent data 208 has expired.

In yet another implementation, the retention data 216 indicative of parameters to control access to the recipient data 108 may include time information indicative of an expiration of a period of time. For example, the period of time may be two (2) hours after receipt of the evanescent data 208. In this example, regardless of whether the user device 106(1) receives a communication from the user device 106(2), the user device 106(1) may determine that the evanescent data 208 has expired. In another example, the period of time may be days, weeks or months long, such as two (2) days, one (1) week, or one (1) month.

In other implementations, the user device 106(1) may ping or send a notification to the application service 210 indicating that one or more of the parameters to prevent access to the evanescent data 208 has occurred. In one implementation, the user device 106(1) may receive instructions from the application service 210 to prevent access to at least a portion of the evanescent data 208. Preventing the user device 106(1) the ability to access the evanescent data 208 may include deleting the evanescent data 208, preventing the user device 106(1) from communicating with the source identifier associated with the user device 106(2), overwriting the evanescent data 208 with general data indicative of a service provider name and a general phone number (or other general identifier), removing decryption keys, or a combination thereof. In another implementation, the user device 106(1) may not receive a notification or instructions from the application service 210. In this implementation, the user device 106(1) may determine that the evanescent data 208 is not accessible because the user device 106(1) did not receive a notification or instructions from the application service 210. For example, a heartbeat message may be sent from the application service 210 to the user device 106(1). So long as the heartbeat message is received, the evanescent data 208 may be accessible. If the heartbeat message is not received for a threshold amount of time, the evanescent data 208 may be rendered inaccessible.

In some implementations the application service 210 may ping or send a notification request to the user device 106(1) of whether one or more of the parameters as described above have exceeded a threshold value. In this implementation, the application service 210 may receive a response from the user device 106(1) that one or more of the parameters have exceeded their respective thresholds. Upon receipt of this response, the application service 210 may be configured to send a notification or instruction to the user device 106(1) that the evanescent data 208 is not accessible and to prevent access to at least a portion of the evanescent data 208 stored on the user device 106(1). As described above, preventing the user device 106(1) the ability to access the evanescent data 208 may include deleting the evanescent data 208, preventing the user device 106(1) from communicating with the source identifier associated with user device 106(2), overwriting the evanescent data 208 with general data indicative of a service provider name and a general phone number, removing decryption keys, or a combination thereof.

At 310, the user device 106(1) may be configured to control or prevent access to at least a portion of the evanescent data 208. In one implementation, preventing the user 104(1) the ability to access the contact information on the user device 106(1) may include deleting the evanescent data 208, preventing the user device 106(1) to send a communication to the phone number associated with the user device 106(2), overwrite the evanescent data 208 with general data indicative of a service provider name and a general phone number, marking the evanescent data 208 as not being usable, setting a pointer or memory reference in a datastore of the user device 106(1) to a different memory location, copying over the evanescent data 208 with general data indicative of a service provider name and a general phone number, removing decryption keys, or a combination thereof. In another implementation, controlling access to at least a portion of the evanescent data 208 may include the user device 106(1) being configured to intercept data associated with the communication. The data includes the phone number and the contact name. The user device 106(1) may be configured to write within a call log at least the contact name and a general phone number associated with a company that the user 104(2) works for or is a contract worker for. The user device 106(1) may be configured to omit the phone number associated with the contact name when writing within the call log the contact name and the general phone number.

In another implementation, the user device 106(1) may be configured to receive notification data indicative of a notification request from the user device 106(2). The notification may be a request from the user device 106(2) to have the contact information added or kept on the contact list of the user device 106(1). For example, the interface 118 may be configured to depict, via the display 116, a notification request and an area configured to receive a user input of whether to accept or decline the request to have the contact information added to the user device 106(1) contact list. The user device 106(1) may be configured to receive a user input indicative of a command to add the contact information to the contact list. The user device 106(1) after receiving the user input may be configured to add or keep the contact information associated with the user device 106(2).

In yet another implementation, the user device 106(1) may be configured to receive instruction data indicative of an instruction to prevent access to the evanescent data 208 from the application service 210, as described above. In other implementations, the user device 106(1) may not receive a notification or instructions from the application service 210. The user device 106(1) may determine that the evanescent data 208 is not accessible because the user device 106(1) did not receive a notification or instructions from the application service 210. For example, a heartbeat message may be sent from the application service 210 to the user device 106(1). So long as the heartbeat message is received, the evanescent data 208 may be accessible. If the heartbeat message is not received for a threshold amount of time, the evanescent data 208 may be rendered inaccessible.

At 312, the user device 106(2) may be configured to determine whether the user contact data 112 is accessible. In one implementation, the user contact data 112 may include retention data indicative of parameters to control or allow access to the user contact data 112. The retention data indicative of parameters to control or allow access to the user contact data 112 may include communication from a source identifier indicated by the contact information, phone call information indicative of the communication with the user device 106(1) text information indicative of a communication from the user device 106(2) to the user device 106(1), and so forth. For example, the user device 106(2) may be configured to receive a heartbeat message from the application service 210, as described above.

In other implementations, the user device 106(2) may be configured to determine that the user contact data 112 is inaccessible, as described above. For example, the user device 106(2) may be configured to determine that upon completion of a communication between the user device 106(2) and the user device 106(1) that the user contact data 112 is no longer accessible. In other examples, the user device 106(2) may determine that the user contact data 112 is inaccessible based on a period of time. The period of time may be two (2) hours after receipt of the user contact data 112. In this example, regardless of whether the user device 106(2) sends a communication to the user device 106(1), the user device 106(2) may determine that two (2) hours have elapsed since the receipt of the user contact data 112 and that the user contact data 112 has expired.

In other implementations, the retention data indicative of parameters to control or prevent access to the user contact data 112 may include order information indicative of completing an order, as described above. In one example, the user 104(1) may place an order for a child's toy. The user 104(2) may deliver the child's toy to the user 104(1). Prior to the delivery the user device 106(2) may send the communication data 114 to the user device 106(1), as described above. After the user 104(2) has delivered the child's toy to the user 104(1), the user device 106(2) may provide a notification to the application service 210 that the order has been completed. The user device 106(2) may determine that the user contact data 112 is inaccessible based on the completing the order.

In other implementations, the user device 106(2) may ping or send a notification to the application service 210 indicating that one or more of the parameters to prevent access to the evanescent data 208 has reached or exceeded a threshold value, as described above. The application service 210 upon receipt of a response that the threshold value has been reached or exceeded may be configured to send a notification or instruction to the user device 106(2) that the user contact data 112 is not accessible and to prevent access to at least a portion of the user contact data 112 stored on the user device 106(2), as described above. In an implementation, the user device 106(1) does not receive a notification or instructions from the application service 210, the user device 106(2) may determine that the user contact data 112 is not accessible. For example, a heartbeat message may be sent from the application service 210 to the user device 106(2). So long as the heartbeat message is received, the user contact data 112 may be accessible. If the heartbeat message is not received for a threshold amount of time, the user contact data 112 may be rendered inaccessible.

In some implementations the application service 210 may ping or send a notification request to the user device 106(2) of whether one or more of the parameters as described above have exceeded a threshold value. In this implementation, the application service 210 may receive a response from the user device 106(2) that one or more of the parameters have exceeded their respective thresholds. Upon receipt of this response, the application service 210 may be configured to send a notification or instruction to the user device 106(2) that the user contact data 112 is not accessible and to prevent access to at least a portion of the user contact data 112, as described above.

At 314, the user device 106(2) may be configured to control or prevent access to at least a portion of the user contact data 112. Controlling the user's 104(2) ability to access the contact information may include) permitting the user device 106(2) to access the user contact data 112, permitting the user device 106(2) to decrypt and access the user contact data 112, deleting the user contact data 112, preventing the user device 106(2) to send a communication to the phone number associated with the user device 106(1), overwrite the user contact data 112 with general data indicative of an unknown name and unknown or fake phone number, marking the user contact data 112 as not being usable, setting a pointer or memory reference in a datastore of the user device 106(2) to a different memory location, copying over the user contact data 112 with general data indicative of an unknown name and unknown or fake phone number, removing decryption keys, or a combination thereof.

Figure 4:
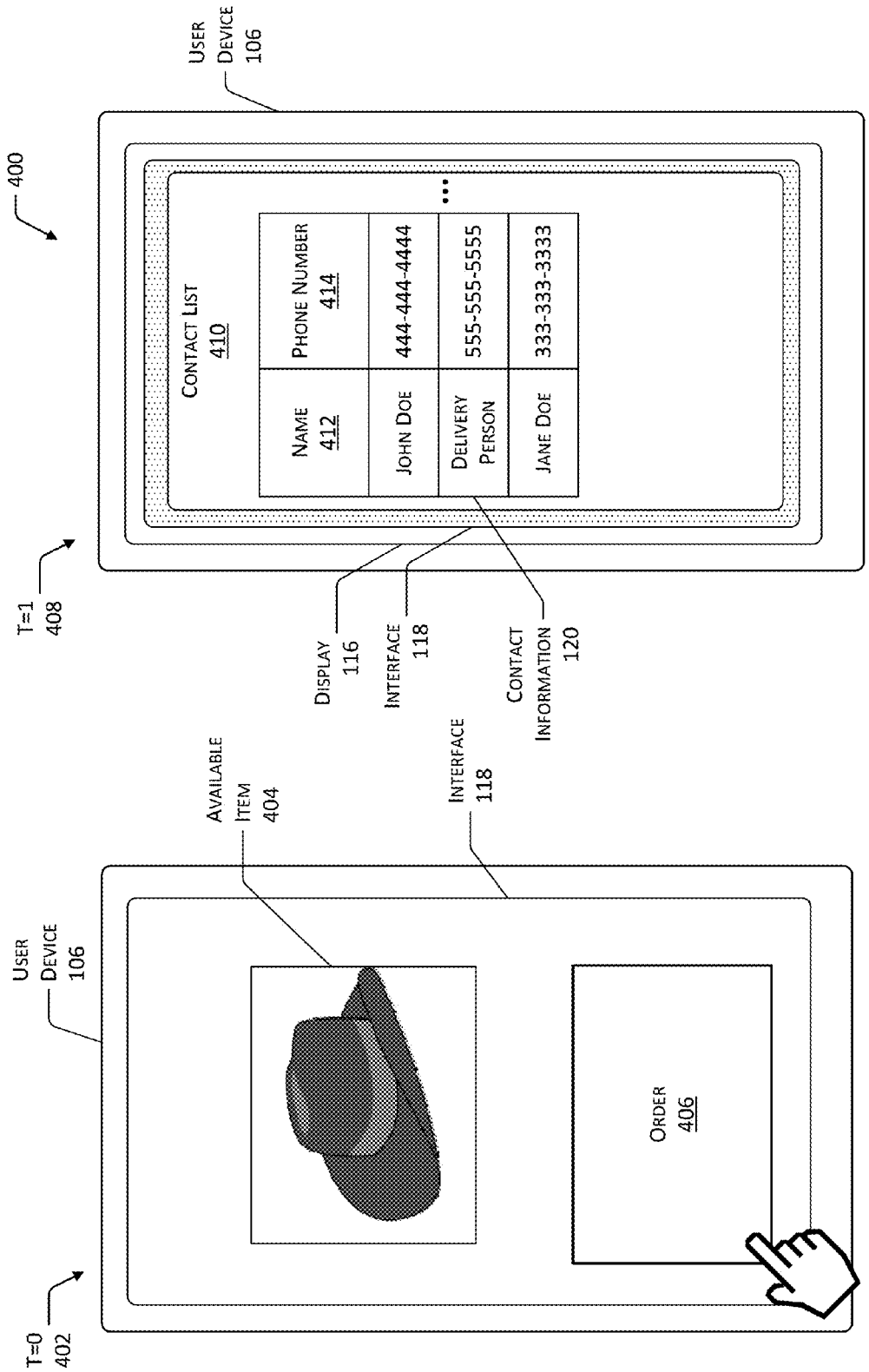
FIGS. 4 and 5 depict an example user interface for sharing and presenting temporary identification information.
Figure 5:
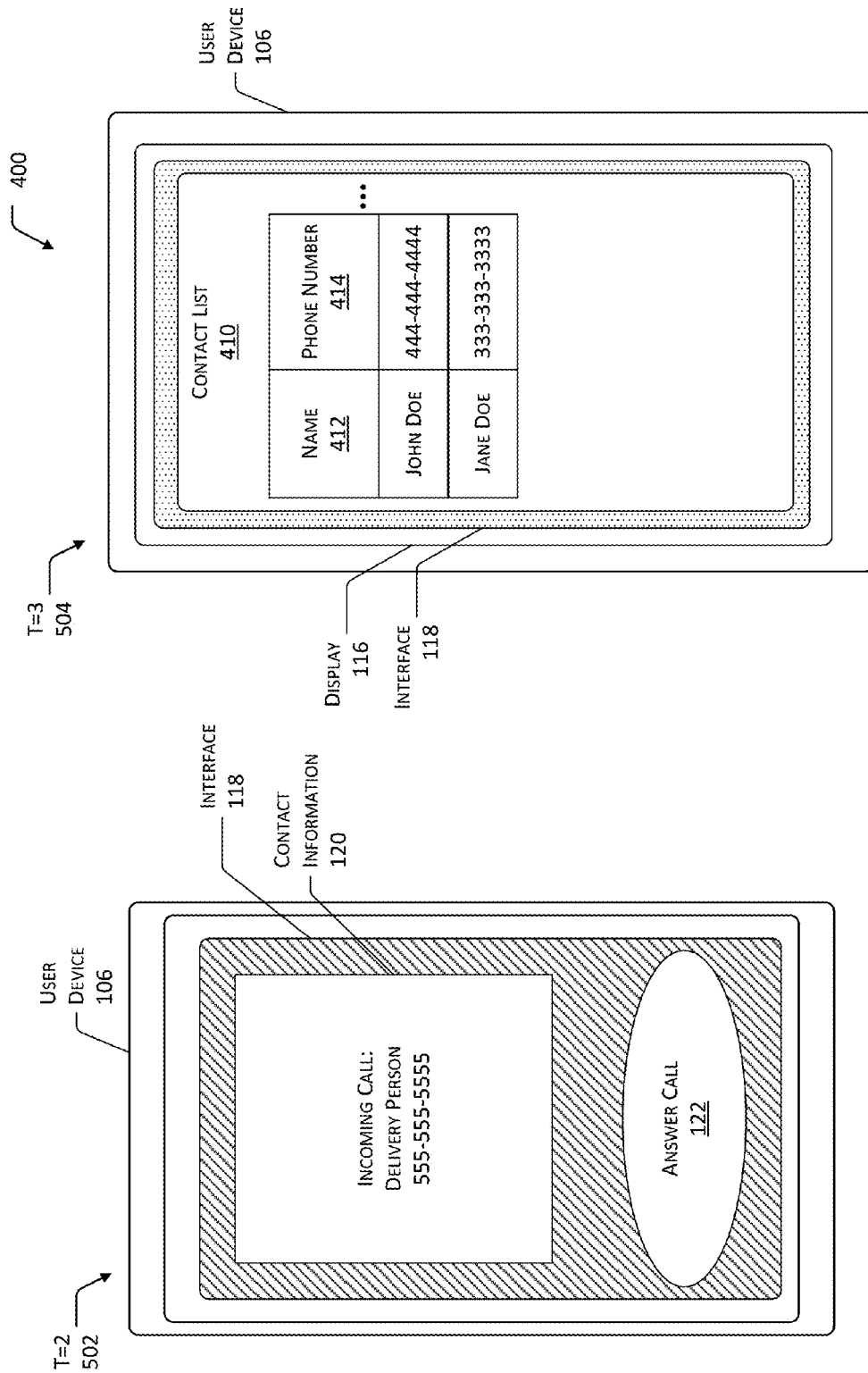
Figure 8:
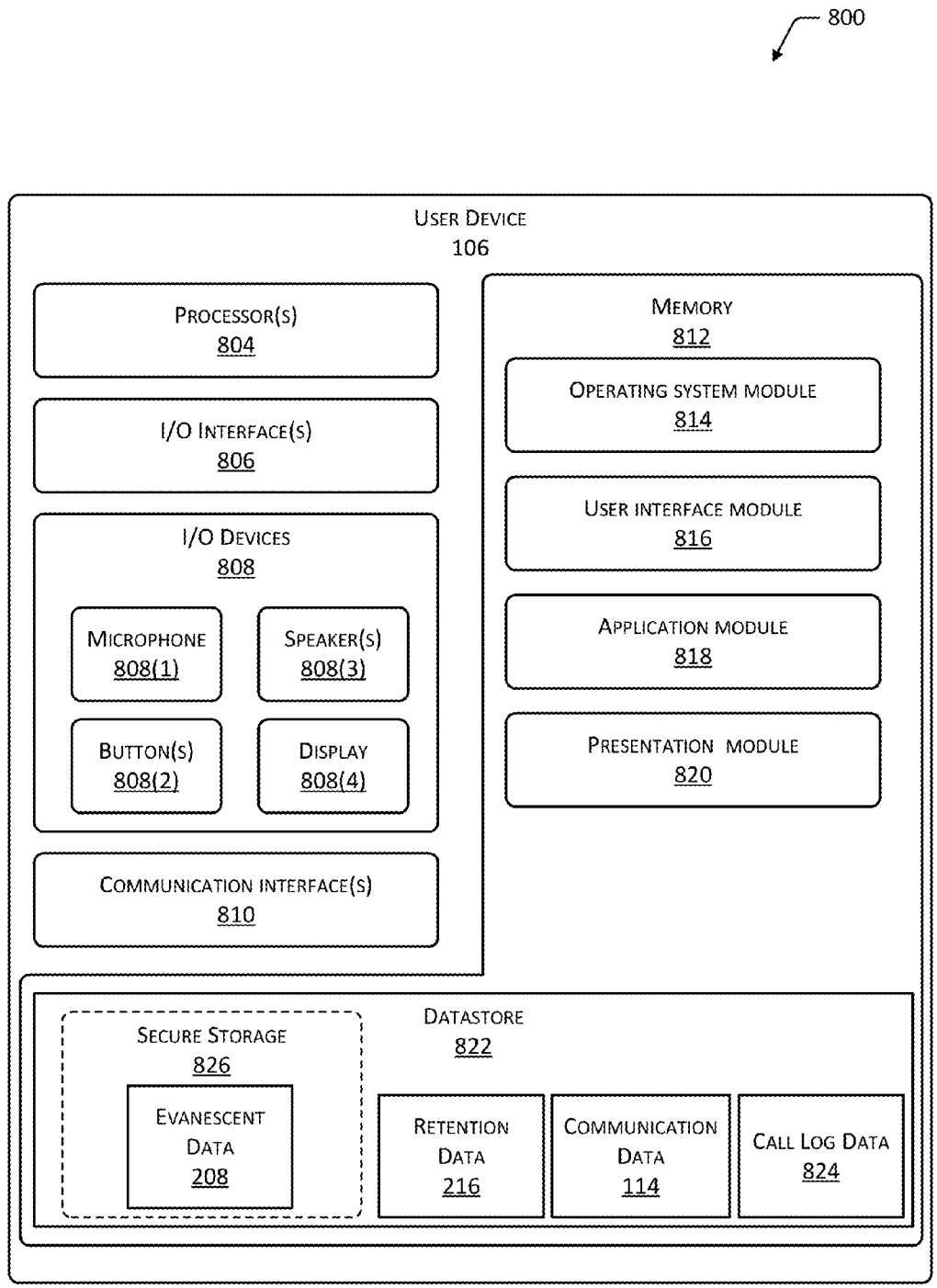
FIG. 8 illustrates a block diagram of a user device to present temporary identification information.

FIGS. 4 and 5 depict an example 400 user interface for sharing and presenting temporary identification information. In some implementations the user interface may be presented by a user interface module 816 as illustrated in FIG. 8.

At time equals zero (T=0) 402, the user device 106 may be configured to provide the interface 118 to depict, via the display 116, available item 404 to the user 104(1) and order 406. In one implementation, the available item may include home items, garden items, tools, sports and outdoor items, beauty, health and grocery items, automotive and industrial items, electronics and computer items, toys, and so forth. As illustrated in FIG. 4, the available item 404 may be a cowboy hat. The user device 106 may be configured to receive a user input indicative of a selection of the available items 404. For example, the user device 106 may receive a user input indicative of a selection to order the cowboy hat. The user device 106 may send selection data indicative of the selection of the available item 404 to one or more services for the completion of the order.

At time equals one (T=1) 408, the user device 106 may be configured to receive the evanescent data 208 indicative of the contact information 120. The user device 106 may be configured to provide the interface 118 to depict, via the display 116, contact list 410. The contact list 410 may include columns and rows. In one implementation, the columns may include a column indicative of name 412 and a column indicative of phone number 414. Each name listed in the name 412 column has an associated phone number in the phone number 414 column. For example, as illustrated in FIG. 4, in the name 412 column is listed John Doe who has an associated phone number 444-444-4444 listed under the phone number 414 column. In this example, the evanescent data 208 indicative of the contact information 120 is included in the contact list 410, which lists Delivery Person in the name 412 column and has an associated phone number 555-555-5555 in the phone number column 414. The phone number associated with Delivery Person may be Delivery Person's actual phone number or may be a general phone number associated with a company that Delivery Person works for or is contracted to work for. Further, in this example, in the name 412 column is listed Jane Doe who has an associated phone number 333-333-3333 listed under the phone number 414 column. In another example, additional names and phone numbers may be listed in the name 412 column and the phone number 414 column. In another implementation, the columns may include columns indicative of a company name, an image of a user or the contact name, an image of a company logo associated with the company name, an authentication code that authenticates the user, and so forth.

In other implementations, the retention data indicative of parameters to control access to the user contact data 112 may include order information indicative of completing an order. The completing of an order may include delivery item(s) that the user 104(1) order or another user ordered for the user 104(1), picking up or dropping off the user 104(1) and so forth. For example, the user 104(1) may place an order for a child's toy. The user 104(2) may deliver the child's toy to the user 104(1). Prior to the delivery the user device 106(2) may send the communication data 114 to the user device 106(1), as described above. After the user 104(2) has delivered the child's toy to the user 104(1), the user device 106(2) may provide a notification to the application server 102 that the order has been completed. The user device 106(2) may prevent the user 104(2) access to the contact information. Mechanisms for controlling and preventing the user 104(2) the ability to access the contact information may be similar to those described above.

FIG. 5 depicts the continuation of example 400 user interface for sharing and presenting temporary identification information from FIG. 4. At time equals two (T=2) 502 the user device 106 may be configured to receive a communication and present the interface 118 via the display 116. The interface 118 may be configured to depict the contact information 120 and the answer call 122. In one implementation, the contact information 120 may include the contact name of the user 104(2) and a phone number associated with the user device 106(2). The phone number may be the user 104(2) actual phone number associated with the user device 106(2) or a general phone number associated with a company that the user 104(2) works for or is a contract worker for. For example, the interface 118 may be configured to display "Incoming Call: Delivery Person 555-555-5555" and the answer call 122. In another implementation, the contact information 120 may include a company name associated with the contact information or the user device 106(2), an image of the user 104(2) or the contact name, an image of a company logo associated with a company name that the user 104(2) works for or is a contract worker, an authentication code that authenticates the user device 106(2), the user 104(2) or both the user device 106(2) and the user 104(2), or a combination thereof.

At time equals three (T=3) 504, the user device 106 may be configured to prevent the user 104(1) access to the contact information. In one implementation, preventing the user 104(1) the ability to access the contact information may include deleting the contact information 120. For example, as illustrated in FIG. 5, the contact information 120 associated with Deliver Guy Bob has been deleted from the contact list 410. In this example, the user device 106 may be configured to provide the interface 118 to depict, via the display 116, the contact list 410. The contact list 410 may include a column indicative of the name 412 column and a column indicative of the phone number 414 column. Each name listed in the name 412 column has an associated phone number in the phone number 414 column. In this example, the name 412 column lists John Doe and Jane Doe and the associated phone number for both John Doe and Jane Doe. The contact information 120 for Delivery Person has been deleted because the user device 106 has determined that the evanescent data 208 indicative of the contact information 120 has expired, as explain above. In another implementation, preventing the user device 106 to send a phone call to the phone number associated with the contact information 120, overwrite the contact information 120 with general data indicative of an unknown name and unknown or fake phone number, marking the contact information 120 as not being usable, setting a pointer or memory reference in a datastore of the user device 106 to a different memory location, copying over the contact information 120 with general data indicative of a service provider name and a general phone number, removing decryption keys, or a combination thereof.

Figure 6:
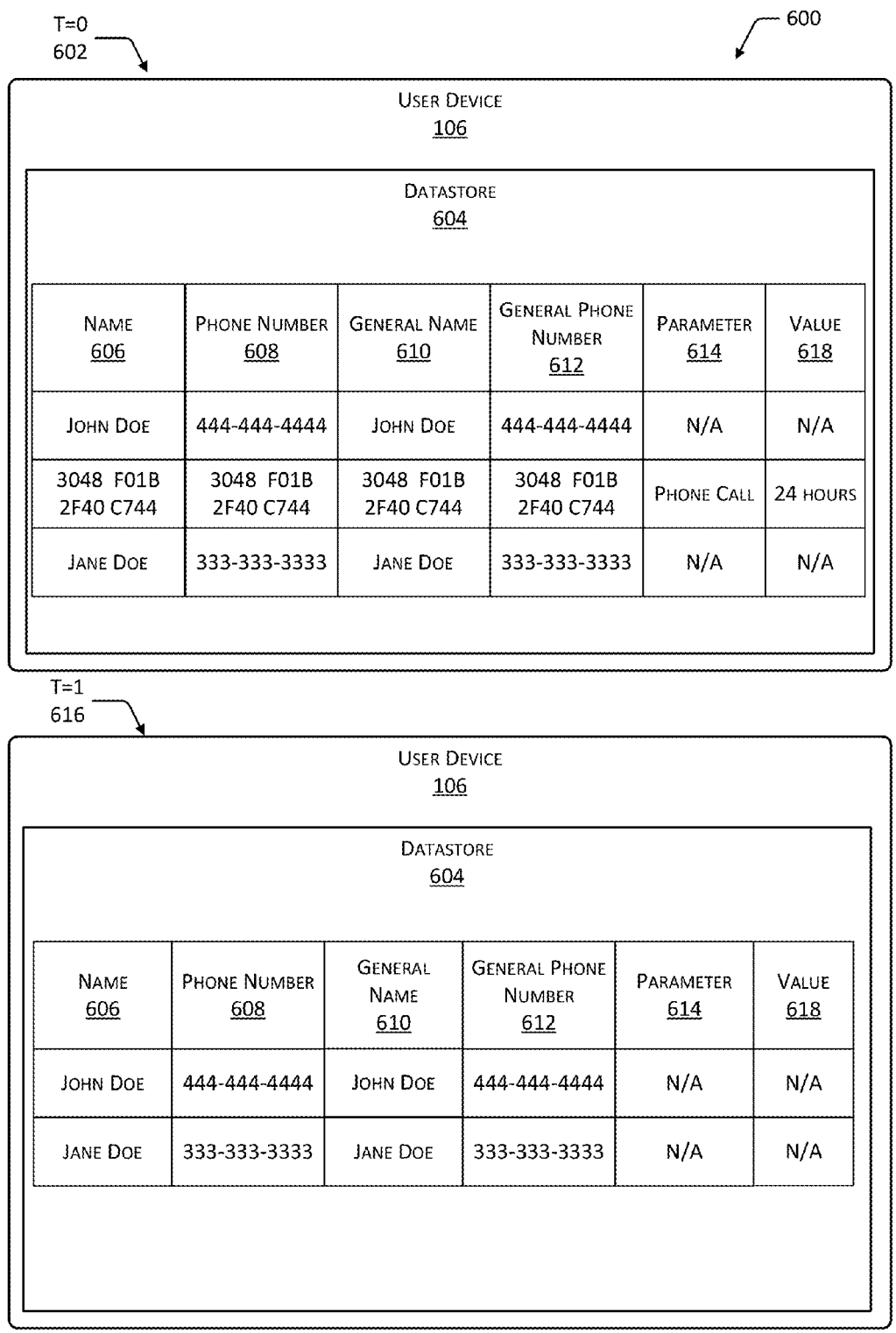
FIG. 6 illustrates block diagrams of a user device datastore for storing and removing temporary identification information.

FIG. 6 illustrates an example 600 block diagrams of a user device datastore for storing and removing temporary identification information. The user device 106 may be configured to include datastore 604. The datastore 604 may be configured to store the evanescent data 208 and the retention data 216. In one implementation, the datastore 604 may be configured to include a secure storage for storing the evanescent data 208. In another implementation, the datastore 604 may be configured to have a first data structure and a second data structure. The first data structure may be configured to include memory 812 as described below with reference to FIG. 8. The first data structure or the memory 812 may be configured to store operating system (OS) module 814, a user interface module 816, application modules 818, a presentation module 820, or a combination thereof. The second data structure may be a secure data structure for storing at least a portion of the evanescent data 208. In other implementations, the datastore 604 may be configured to include a secured portion that encrypts the evanescent data 208 upon receipt or stores the evanescent data 208 as encrypted by the application service 210.

Various technologies may be used to implement the secure storage. For example, a particular portion of system memory may be dedicated for secure storage and the contents of that portion of system memory may be encrypted, subject to access restrictions, and so forth. In another example, a dedicated memory device such as secured memory hardware may be separate from system memory and store encrypted data, be subject to access restrictions, and so forth. In one implementation on devices utilizing a processor implementing technology from ARM Holdings PLC of Cambridge, England, the secure storage may utilize the TrustZone technology. In other implementations on devices utilizing a processor implementing technology from Apple, Inc., of Cupertino, Calif., the secure storage may utilize the iOS Secure Enclave technology. In another implementation on devices utilizing a processor implementing technology from Google, Inc., of Mountain View, Calif., the secure storage may utilize Android full-disk encryption technology, file-based encryption technology, Keymaster HAL technology, or a combination thereof. In yet another implementation, the secure storage may utilize a Trust Platform Module (TPM), which is an international standard for a secure cryptoprocessor, which is a dedicated microcontroller designed to secure hardware by integrating cryptographic keys into devices. In other implementations, the secure storage may be an encrypted user partition.

In one implementation, the datastore 604 may include columns and rows. Each column may be associated with a particular type of data within the evanescent data 208 and the retention data 216. Each row may be associated with a particular user. For example, the datastore 604 may include a name 606 column that stores data indicative of a contact name. The use of the terms "column" and "row" are by way of illustration only and are not intended as a limitation as to the data structure.

In another example, the datastore 604 may include a phone number 608 column that stores data indicative of a phone number associated with the contact name stored in the name 606 column. In yet another example, the datastore 604 may include a general name 610 column that stores data indicative of a general name associated with at least the contact named stored in the name column 606 or the phone number stored in the phone number 608 column. The general name may include a company that the contact name or the user 104(2) works for or is a contract worker for.

In another example, the datastore 604 may include a general phone number 612 column that stores data indicative of a general phone number associated with at least the contact named stored in the name column 606, the phone number stored in the phone number 608 column, or the general name stored in the general name 610 column. The general phone number may be associated with the general name stored in the general name 610 column. In yet another example, the datastore 604 may include a parameter 614 column that stores data indicative of parameters that the user device 106 may be configured to use to determine that the evanescent data 208 has expired. As described above, the parameters may be indicative of, phone call information indicative of a communication from the service personnel, text information indicative of a communication from the service personnel or time information indicative of an expiration of a period of time. In other examples, the datastore 604 may include one or more columns to store data indicative of an image of the user 104(2) or the contact name stored in the name 606 column, an image of a company logo associated with the general name stored in the general name 610 column, authentication code(s) that authenticate the user device 106(2), the user 104(2) or both the user device 106(2) and the user 104(2), or a combination thereof.

In other examples, the datastore 604 may include a value 618 column that stores data indicative of a threshold such as a lifespan or lifetime of the evanescent data 208. The data may be time to live (TTL) data or hop limit data. The TTL data may be indicative of one or more of a counter value, elapsed time value, timestamp, and so forth. The TTL data may be stored in the value 618 column. For example, the TTL data stored in the value 618 column, as illustrated in FIG. 6, is indicative of a lifespan of 24 hours. A countdown of the 24 hours may occur upon receipt of the evanescent data 208, upon a determination that the parameter stored in the parameter 614 column has occurred, or a combination thereof. Once the prescribed timespan has elapsed, the user device 106 may be configured to prevent access to the evanescent data stored in the columns 606, 608, 610, and 612, as described above.

At time equals zero (T=0) 602, the user device 106 may be configured to receive the evanescent data 208 and the retention data 216. The evanescent data 208 and the retention data 216 may be received separate from each other, received at the same time, or the retention data 216 may be included in the evanescent data 208. The user device 106 may be configured to store the evanescent data 208 and the retention data 216 within the datastore 604. The evanescent data 208 may include contact information. The contact information may include a contact name, a phone number, a general name, a general phone number, or a combination thereof. The contact name may be Delivery Person. The phone number may be 555-555-5555. The general name may be Delivery Co. The general phone number may be 800-800-8000. In another implementation, the user device 106 may be configured to store the data indicative of the contact name Delivery Person in the name 606 column and the data indicative of the phone number 555-555-5555 in the phone number 608 column. In another implementation, the user device may be configured to store the data indicative of the general name Delivery Co. in the general name 610 column and the data indicative of the general phone number 800-800-80000 in the general phone number 612 column. The evanescent data 208 may be encrypted using a public key associated with the user device 106. The user device 106 may store each piece of the encrypted evanescent data 208 in its corresponding column and row. As illustrated in FIG. 6, the contact name, the phone number, the general name, and the general phone number are encrypted using a public key represented by long random number "3048 F01B 2F40 C744". In another implementation, the evanescent data 208 may be encrypted using a using a symmetric-key scheme, ciphers, digital certificates, or other credentials supported by a security protocol such as any version of the SSL or the TLS protocol.

The user device 106 upon accessing the one or more of the evanescent data 208 stored in the columns 606, 608, 610, and 612 in the secured storage may use the private key stored on the user device 106 to decrypt the encrypted evanescent data 208. For example, the user device 106 may decrypt the data indicative of a contact name stored in the name 606 column. In this example, the user device 106 may decrypt the data indicative of the contact name based on a determination, as described above, that the communication received from the user device 106(2) is associated with the data stored in the name 606 column. The user device 106 upon the decryption of the data stored in the name 606 column may be configured to display the contact name to the user 104(1).

In one implementation, the retention data 216 may be indicative of parameters to prevent access to the evanescent data 208. The parameters as described above may be indicative of, phone call information indicative of a communication from the service personnel, text information indicative of a communication from the service personnel or time information indicative of an expiration of a period of time. For example, as illustrated in FIG. 5, the parameter may be indicative of phone information indicative of receiving a phone call from Delivery Person. The user device 106 may be configured to store the data indicative of the phone call parameter in the parameter 614 column associated with Delivery Person's contact information.

In another example, the user device 106 may be configured to store other data indicative of contact information of other users. For example, the user device 106 may receive other data indicative of contact information of other users. The contact information of the other users may include contact names, for example, John Doe and Jane Doe, and phone numbers associated with the contact names. The user device 106 may be configured to store the data indicative of the contact names. For example, the user device 106 may store the data indicative of the contact name John Doe and Jane Doe in the name 606 column. The user device 106 may further be configured to store the data indicative of the phone numbers associated with the contact name John Doe and Jane Doe. For example, the user device 106 may store the data indicative of phone number 444-444-4444 in the phone number 608 column and associate the phone number 444-444-4444 with John Doe. The user device 106 may also store the data indicative of phone number 333-333-3333 in the phone number 608 column and associate the phone number 333-333-3333 with Jane Doe.

The other data may not include data indicative of a general name, a general phone number, parameter(s), or a combination thereof. The user device 106 may be configured to store the data associated with the name 606 column and the phone number 608 column within the general name 610 column and the general phone number 612 column. For example, the data associated with the contact name John Doe or Jane Doe may be stored in the general name 610 column and the general phone number 612 column. In this example, the data indicative of the contact name John Doe and Jane Doe in the name 606 column may be stored within the general name 610 column. The data indicative of the phone numbers associated with the contact name John Doe and Jane Doe may be stored within the general phone number 612 column. For example, the data indicative of the phone numbers 444-444-4444 and 333-333-3333 may be stored within the general phone number 612 column.

At time equals one (T=1) 616, the user device 106 may determine that the evanescent data 208 indicative of the contact information has expired. In one implementation, the datastore 604 includes the retention data 216 indicative of parameters to prevent access to the evanescent data 208. The parameters may include phone call information indicative of a communication from the user device 106(2). For example, the user device 106 may receive a phone call from the user device 106(2) associated with the contact name Delivery Person indicating that the user 104(2) is about to deliver the user 104(1) order. In one implementation, the user device 106 upon completion of the phone call may prevent the user 104(1) access to the contact information associated with Delivery Person. In another implementation, the user device 106(1) after a period of time from completion of the phone call may prevent the user 104(1) access to the contact information associated with Delivery Person. For example, the period of time may be two (2) hours after the competition of the phone call, which then the user device 106(1) prevents the user 104(1) access to the contact information. Preventing the user 104(1) the ability to access the contact information may include deleting the recipient data 108, preventing the user device 106(1) to send a phone call to the phone number associated with the user device 106(2), overwrite the evanescent data 208 with general data indicative of a service provider name and a general phone number, marking the evanescent data 208 as not being usable, setting a pointer or memory reference in a datastore of the user device 106(1) to a different memory location, copying over the evanescent data 208 with general data indicative of a service provider name and a general phone number, removing decryption keys, or a combination thereof. For example, as illustrated in FIG. 6 at (T=1) 616, the user device 106 after determining a phone call with Delivery Person has been completed may be configured to delete the contact information associated with Delivery Person from the datastore 604.

In another implementation, the parameters may be indicative of text information indicative of a communication from Delivery Person or time information indicative of an expiration of a period of time. The user device 106 may be configured to determine that the evanescent data 208 has expired based on either of these parameters and be configured to prevent access to the evanescent data 208 as described above.

Figure 7:
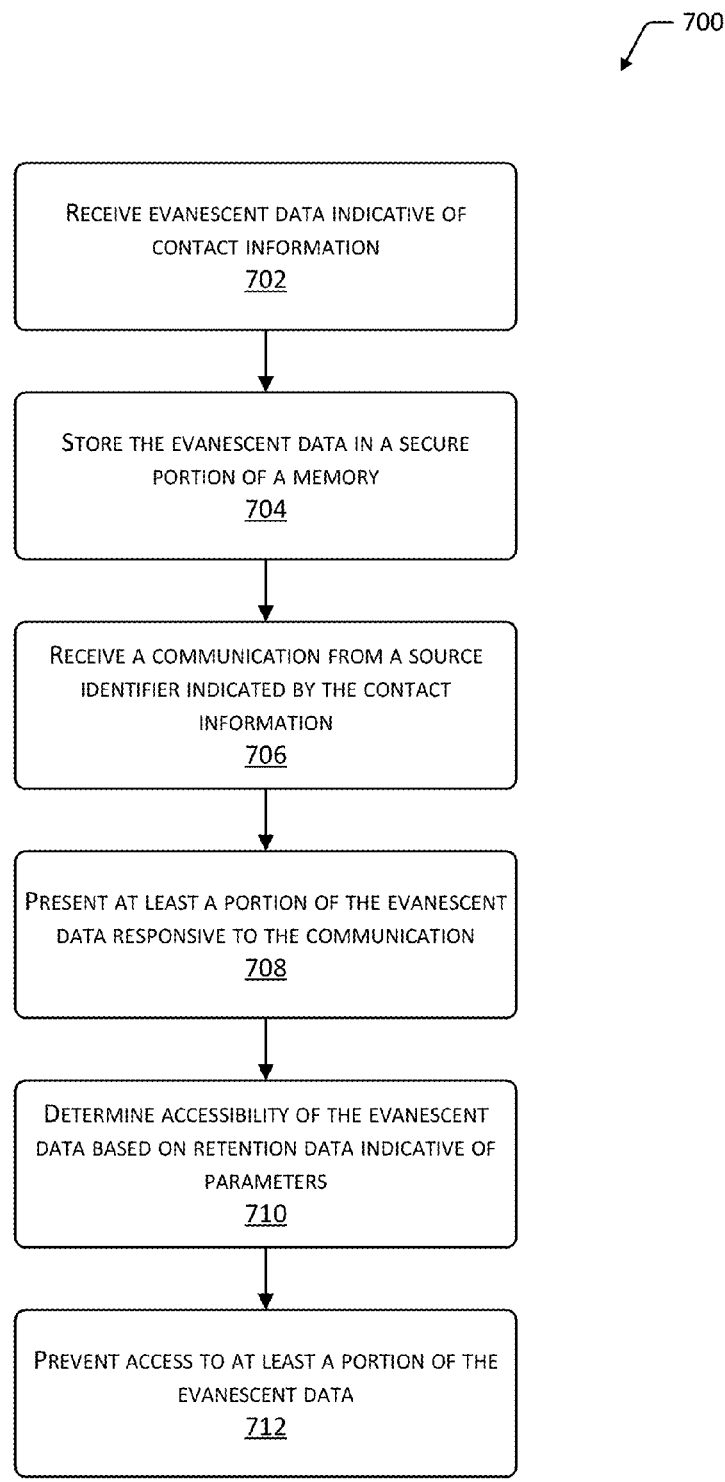
FIG. 7 is a flow diagram of a process of sharing and presenting temporary identification information.

FIG. 7 is a flow diagram of a process 700 for processing, sharing and presenting temporary identification information. Although the process 700 is described with reference to the flowchart illustrated in FIG. 7, many other methods performing the acts associated with the process 700 may be used. For example, the order of the steps may be changed, some of the steps described may be optional, and additional steps may be included.

At 702, the user device 106 may be configured to receive the evanescent data 208 indicative of contact information from the application server 102 or the application service 210. In one implementation, the evanescent data 208 may be temporary data that includes a contact name and a phone number associated with a service provider. The contact name of the service provider may be the user 104(2). The phone number may be associated with the user device 106(2). In another implementation, the evanescent data 208 may include an image of service personnel or the user 104(2) or the contact name, a company logo associated with a company that the service personnel or the user 104(2) is associated with, a company name of the company that the service provider or the user 104(2) is associated with, authentication codes, and so forth. In yet another implementation, the evanescent data 208 includes general data indicative of a service provider name and a general phone number. For example, the service provider name may be the company that the service personnel or the user 104(2) works for or is contracted to work for. The general phone number may be a phone number associated with the company, such as, the main phone number for the company. In other implementations, the evanescent data 208 may be encrypted by the application service 210 using a public-private key scheme, a symmetric-key scheme, ciphers, digital certificates, or other credentials supported by a security protocol such as any version of the SSL or the TLS protocol, as described above.

In another implementation, the user device 106 may be configured to receive the retention data 216 indicative of parameters to control or prevent access to the evanescent data 208 from the application server 102 or the application service 210. The retention data 216 may be sent separate from the evanescent data 208, sent at the same time, or the retention data 216 may be included in the evanescent data 208. In one implementation, the retention data 216 indicative of parameters to control or prevent access to the evanescent data 208 may include phone call information indicative of a communication from the user device 106(2). For example, the user device 106(1) may receive a phone call from the user device 106(2) indicating that the user 104(2) is about to deliver the user 104(1) order. In one implementation, the user device 106(1) upon completion of the phone call may prevent the user 104(1) access to the contact information. In another implementation, the user device 106(1) after a period of time from completion of the phone call may prevent the user 104(1) access to the contact information. For example, the period of time may be two (2) hours after the competition of the phone call, which then the user device 106(1) prevents the user 104(1) access to the contact information.

In yet another implementation, the retention data 216 indicative of parameters to control or prevent access to the evanescent data 208 may include text information indicative of a communication from the user device 106(2) to the user device 106(1). For example, the user device 106(1) may receive a text message from the user device 106(2) indicating that the user 104(2) is about to deliver the user 104(1) order. In one implementation, the user device 106(1) upon receipt of the text message may prevent the user 104(1) access to the contact information. In another implementation, the user device 106(1) upon determining that the user 104(1) has accessed the text message may prevent the user 104(1) access to the contact information. In yet another implementation, the user device 106(1) after a period of time from receipt or access to the text message may prevent the user 104(1) access to the contact information. For example, the period of time may be two (2) hours after the receipt or access of the text message, which then the user device 106(1) prevents the user 104(1) access to the contact information.

In other implementations, the retention data 216 indicative of parameters to control or prevent access to the evanescent data 208 may include time information indicative of an expiration of a period of time. For example, the period of time may be two (2) hours after receipt of the evanescent data 208. In this example, regardless of whether the user device 106(1) receives a communication from the user device 106(2), the user device 106(1) may prevent the user 104(1) access to the contact information. In another example, the period of time may be days, weeks or months long, such as two (2) days, one (1) week, or one (1) month. In this example, after the user device 106(1) determines that the period of time has expired, the user device 106(1) may prevent the user 104(1) access to the contact information.

At 704, the user device 106, in one implementation, may be configured to store the evanescent data 208 in a secure storage of a memory. The user device 106(1) may generate a contact list that includes public contact fields and hidden contact fields. The public contact fields and the hidden contact fields may be stored in the secure storage. The public contact fields may include contact name fields associated with at least the contact name. The public contact fields may also include fields to store the image of service personnel or the user 104(2), the company logo associated with the company that the service personnel or the user 104(2) is associated with, the company name of the company that the service provider or the user 104(2) is associated with, authentication codes, the general phone number associated with the company, and so forth. The public contact fields may be configured to be presented on the display 116 of the user device 106(1). The hidden contact fields may include a phone number field associated with at least the phone number. The hidden contact fields may be configured to omit the presentation of the phone number located in the hidden contact field. As described above, one or more of the public contact fields and the hidden contact fields may be encrypted. The data stored in the one or more public contact fields and the hidden contact fields may be encrypted by the application service 210 using a public-private key scheme, a symmetric-key scheme, ciphers, digital certificates, or other credentials supported by a security protocol such as any version of the SSL or the TLS protocol, as described above.

In another implementation, the application server 102 or the application service 210 may be configured to send a notification request to access the contact list on the user device 106(1) to store the evanescent data 208. The user device 106(1) may be configured to receive a user input to allow the application service 210 to access the contact list and send the user input to the application service 210. The application service 210 or the user device 106(1) may be configured to generate a contact location to store the evanescent data 208. The contact location may include a public contact field and a hidden contact field as described above.

In yet another implementation, the user device 106 may be configured to store the retention data 216 within a data structure. In one implementation, the retention data 216 is stored in a separate data structure from the evanescent data 208. In another implementation, the retention data 216 is stored with the evanescent data 208. As described above, the user device 106(1) or the application service 210 may generate a contact list that includes public contact fields and hidden contact fields. The public contact fields may include contact name fields associated with at least the contact name. The hidden contact fields may include a phone number field associated with at least the phone number. The hidden contact fields may also include one or more fields to include the retention data 216. For example, at least one of the fields may be to store phone call information indicative of a communication from the user device 106(2). In another example, at least one of the fields may be to store text information indicative of a communication from the user device 106(2) to the user device 106(1). In yet another example, at least one of the fields may be to store time information indicative of an expiration of a period of time.

At 706, the user device 106 may be configured to receive a communication from a source identifier indicated in the contact information 120. The communication in one embodiment may be a phone call. In another embodiment, the communication may be a text message. The source identifier, in one implementation, may be the user device 106(2). In another implementation, the source identifier may be a phone number, messaging service handle, email address, IP address, and so forth, associated with the user device 106(2).

Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

At 708, the user device 106 may be configured to present at least a portion of the evanescent data 208 indicative of the contact information 120 responsive to receiving the communication. In one implementation, the user device 106(1) may be configured to present the interface 118 via the display 116. The interface 118 may be configured to depict the contact information 120 and the answer call 122. In one implementation, the contact information 120 may include the contact name of the user 104(2) and a phone number associated with the user device 106(2). The phone number may be the user 104(2) actual phone number associated with the user device 106(2) or a general phone number associated with a company that the user 104(2) works for or is a contract worker for. For example, as depicted in FIG. 1, the interface 118 may be configured to display "Incoming Call: Delivery Person 555-555-5555" and the answer call 122. In another implementation, the contact information 120 may include a company name associated with the user device 106(2) or the user 104(2), an image of the user 104(2) or the contact name, an image of a company logo associated with a company name that the user 104(2) works for or is a contract worker, an authentication code that authenticates the user device 106(2), the user 104(2) or both the user device 106(2) and the user 104(2), or a combination thereof.

The user device 106(1) may be configured to receive a user input from the user 104(1). The user input may be indicative of accepting the communication from the user device 106(2). In one implementation, the user input may be associated with the user 104(1) touching the display 116 of the user device 106(1) to indicate an acceptance of the communication. In another implementation, the user input may be associated with a phrase. For example, the phrase may be "answer", which may cause the user device 106(1) to accept the communication between the user device 106(1) and the user device 106(2).

In another embodiment, the user device 106(1) may be configured to receive authentication data indicative of a code that authenticates the source identifier. In one implementation, the code may be a phrase, numbers, order confirmation number, a combination of letters and numbers and so forth. For example, the user device 106(1) may receive the authentication data and be configured to generate the interface 118 to depict the code via the display 116 or generated speech that says aloud to the user 104(1) the code. In this example, the code may be numbers, such as, "1234." The user device 106(1) may display or say aloud the numbers "1234." The user device 106(1) may also be configured to verify that the code matches a second code stored with the datastore 604. For example, the datastore 604 may include an authentication code column with data indicative of the code "1234." The user device 106(1) upon receipt of the authentication data may look up within the datastore 604 the authentication code associated with the user 104(2) or the service personnel and verify that the code received from the user device 106(2) matches the authentication code stored in the datastore 604.

In yet another embodiment, the user device 106 may be configured to present at least a portion of the evanescent data 208 indicative of the contact information 120 based on a location or geolocation of the user device 106. The user device 106 may be configured to determine a first location or first geolocation of a device and decrypt a first portion of the contact information associated with first evanescent data based on the first location or first geolocation. For example, the user device 106(1) may determine that the user device 106(1) is within a certain distance from a destination point. The destination point may be where the user 104(1) is to meet the user 104(2). The certain distance may be, for example, 10 feet away from the destination point. In this example, the user device 106(1) may decrypt the portion of the evanescent data 208 indicative of the contact name of the user 104(2). The user device 106(1) may be configured to determine a second location or second geolocation of the user device 106(1) and decrypt a second portion of the contact information associated with the second evanescent data based on the second location or second geolocation. For example, the user device 106(1) may determine that the user device 106 (1) is within a certain distance from the destination point. The destination point may be where the user 104(1) is to meet the user 104(2). The certain distance may be, for example, 2 feet away from the destination point. In this example, the user device 106(1) may decrypt the portion of the evanescent data 208 indicative of the phone number associated with the user device 106(2).

In other embodiments, the user device 106(1) may be configured to receive from the source identifier, first authentication data. The source identifier, in one implementation, may be the user device 106(2). In another implementation, the source identifier may be a phone number, messaging service handle, email address, IP address, and so forth, associated with the user device 106(2). The user device 106(1) may be configured to send second authentication data to the source identifier. The user device 106(1) may be configured to determine that the first authentication data and the second authentication data match within a threshold value. The user device 106(1) may be further configured to receive from the source identifier first verification data. The user device 106(1) may also be configured to send, to the source identifier, second verification data. For example, the user device 106(2) may send the first authentication data indicative of a code to the user device 106(1). The code may be a phrase, numbers, order confirmation number, a combination of letters and numbers and so forth. In this example, the code may be numbers, such as, "1234."

The user device 106(1) may be configured to determine that the code matches a second code stored with the datastore 604 as described above. The user device 106(2) may be configured to receive the second authentication data indicative of a second code from the user device 106(1). The user device 106(2) may be configured to determine that the second code matches the code stored with a datastore within the user device 106(2), as described above. The user device 106(1) may be configured to receive from the user device 106(2) the first verification data indicative that the first code and the second code match within the threshold value. The user device 106(1) may be configured to send to the user device 106(2) the second verification data indicative that the first code and the second code match within the threshold value.

The threshold value, in one implementation, may be an exact match between the codes. For example, the first code and the second code may be "1234" and if one of the codes is not exactly "1234" then the match does not fall within the threshold value. In another implementation, the threshold value may be a range within which the codes may need to match. For example, the range may be that 3 out of 4 of the characters may match. In this example, the first code provided may be "1235" and the second code provided may be "1234." The correct code, in this example is "1234," however since, 3 of the 4 characters in the first code were correct, the user device 106 may determine that the codes match within the threshold value.

In other implementations, as described above, the user device 106(1) may be configured to decrypt the evanescent data 208 in response to receiving the communication from a source identifier indicated by the contact information. By decrypting the evanescent data 208 stored in the secure storage, the user device 106(1) may be configured to present at least portion of the evanescent data 208 indicative of the contact information 120, as described above.

At 710, the user device 106 may determine the accessibility of the evanescent data 208. In one implementation the user device 106(1) determines the accessibility of the evanescent data 208 based on the retention data 216. As described above, the retention data 216 may be indicative of parameters to control or prevent access to the evanescent data 208. In one implementation, the retention data 216 indicative of parameters to control or prevent access to the evanescent data 208 may include phone call information indicative of a communication from the user device 106(2). For example, the user device 106(1) may receive a phone call from the user device 106(2) indicating that the user 104(2) is about to deliver the user 104(1) order. In this example, the user device 106(1) may be enabled to access the evanescent data 208 upon receipt of the communication. After the communication is complete, the user device 106(1) may determine that the evanescent data 208 is no longer accessible. In another implementation, the phone call information may include that after a period of time from completion of the phone call the evanescent data 208 has expired. For example, the period of time may be two (2) hours after the competition of the phone call, which then the user device 106(1) determines that the evanescent data 208 has expired.

In another implementation, the retention data 216 indicative of parameters to control or prevent access to the recipient data 108 may include text information indicative of the communication from the user device 106(2) to the user device 106(1). For example, the user device 106(1) may receive a text message from the user device 106(2) indicating that the user 104(2) is about to deliver the user 104(1) order. In one implementation, the user device 106(1) upon receipt of the text message may be enabled to access the evanescent data 208 and present at least a portion of the evanescent data 208 to the user 104(1). After the user device 106(1) has accessed the text message, the user device 106(1) may determine that the evanescent data 208 is no longer accessible. In yet another implementation, the user device 106(1) after a period of time from receipt or access to the text message may determine that the evanescent data 208 has expired. For example, the period of time may be two (2) hours after the receipt or access of the text message, which then the user device 106(1) determines that the evanescent data 208 has expired.

In yet another implementation, the retention data 216 indicative of parameters to control or prevent access to the recipient data 108 may include time information indicative of an expiration of a period of time. For example, the period of time may be two (2) hours after receipt of the evanescent data 208. In this example, regardless of whether the user device 106(1) receives a communication from the user device 106(2), the user device 106(1) may determine that the evanescent data 208 has expired. In another example, the period of time may be days, weeks or months long, such as two (2) days, one (1) week, or one (1) month.

At 712, the user device 106(1) may be configured to prevent access to at least a portion of the evanescent data 208, as described above. In one implementation, preventing the user 104(1) the ability to access the contact information on the user device 106(1) may include deleting the evanescent data 208, preventing the user device 106(1) to send a communication to the phone number associated with the user device 106(2), overwrite the evanescent data 208 with general data indicative of a service provider name and a general phone number, marking the evanescent data 208 as not being usable, setting a pointer or memory reference in a datastore of the user device 106(1) to a different memory location, copying over the evanescent data 208 with general data indicative of a service provider name and a general phone number, removing decryption keys, or a combination thereof. In another implementation, preventing access to at least a portion of the evanescent data 208 may include the user device 106(1) being configured to intercept data associated with the communication. The data includes the phone number and the contact name. The user device 106(1) may be configured to write within a call log at least the contact name and a general phone number associated with a company that the user 104(2) works for or is a contract worker for. The user device 106(1) may be configured to omit the phone number associated with the contact name when writing within the call log the contact name and the general phone number.

In another implementation, the user device 106(1) may be configured to receive notification data indicative of a notification request from the user device 106(2). The notification may be a request from the user device 106(2) to have the contact information added or kept on the contact list of the user device 106(1). For example, the interface 118 may be configured to depict, via the display 116, a notification request and an area configured to receive a user input of whether to accept or decline the request to have the contact information added to the user device 106(1) contact list. The user device 106(1) may be configured to receive a user input indicative of a command to add the contact information to the contact list. The user device 106(1) after receiving the user input may be configured to add or keep the contact information associated with the user device 106(2).

FIG. 8 illustrates a block diagram 8 of the user device 106. The user device 106 is illustrative and non-limiting, and may be defined by a desktop computer, a tablet computer, a wearable computer, an e-book reader, a media device, a cellular phone, a laptop computer, or another suitable apparatus. The user device 106 may include one or more processors 804 configured to execute one or more stored instructions. The processor(s) 804 may comprise one or more cores, and may also be referred to as hardware processors.

The user device 106 may include one or more I/O interface(s) 806 to allow the processor(s) 804 or other portions of the user device 106 to communicate with various other user devices 106, other computing devices, a server 902, the application server 102, the application service 210, web-based resources, and so on. The I/O interface(s) 806 may comprise I2C, SPI, USB, RS-232, and so forth.

The I/O interface(s) 806 may couple to one or more I/O devices 808. The I/O devices 808 may include one or more input devices such as a keyboard, a mouse, a microphone 808(1), a digital camera, user input buttons 808(2), and so forth. The I/O devices 808 may also include output devices such as audio speakers 808(3), one or more displays 808(4), and so forth. In some embodiments, the I/O devices 808 may be physically incorporated within the user device 106, or they may be externally placed. The I/O devices 808 may include various other devices, as well.

The user device 106 may also include one or more communication interfaces 810. The communication interface(s) 810 are configured to provide communications with other user devices 106, web-based resources, the application server 102, the application service 210, server 902, routers, wireless access points, and so forth. The communication interfaces 810 may include wireless functions, devices configured to couple to one or more networks including LANs, Wireless-LANs, WANs, and so forth. The user device 106 may also include one or more busses or other internal communications hardware or software that allow for the transfer of data between the various modules and components of the user device 106.

The user device 106 includes one or more memories 812. The memory 812 comprises one or more computer-readable storage media (CRSM). The memory 812 provides storage of computer readable instructions, which enable the user device 106 to present the available items 404, data structures, program modules, and other data used during the operation of the user device 106. The memory 812 may include at least one operating system (OS) module 814. Respective OS modules 814 are configured to manage hardware devices such as the I/O interface(s) 806, the I/O devices 808, the communication interface(s) 810, and provide various services to applications or modules executing on the processors 804.

Also stored in the memory 812 may be one or more of the following modules. These modules may be executed as foreground applications, background tasks, and so forth. A user interface module 816 may be configured to provide user interface 118 and may also provide one or more application programming interfaces. The user interface module 816 may be configured to operate with information encoded as hypertext markup language ("HTML") files, extensible markup language ("XML") files, or in another suitable format or language. The user interface module 816 is configured to accept inputs and send outputs using the I/O interfaces 806, the communication interfaces 810, or both.

The memory 812 may also store one or more of the application modules 818. The application modules 818 may include a word processing application, a spreadsheet application, a technical drawing or illustrating application, a photo editing application, a web browsing application, a portable document viewing application and so on.

The memory 812 may also include a presentation module 820. The presentation module 820 may be configured to present the available items 404, the contact list 410 the interface 118, the contact information 120, the order 406, and the answer call 122.

The memory 812 may also include a datastore 822 to store information. The datastore 822 may use a flat file, database, linked list, tree, executable code, or other data structure to store the information. In some implementations, the datastore 822 or a portion of the datastore 822 may be distributed across one or more user devices 106 or computing devices including the server 902, network attached storage apparatus, and so forth.

The user device 106 may include secure storage 826. Various technologies may be used to implement the secure storage 826. In the implementation depicted here, a particular portion of the datastore 822 may be dedicated for the secure storage 826 and the contents of which may be encrypted, subject to access restrictions, and so forth. In other implementations, the secure storage 826 may be elsewhere within the memory 812, or use a dedicated memory device. The secure datastore 826 may be configured to store the evanescent data 208, the retention data 216, communication data 114, call log data 824, or a combination thereof in an encrypted form. As described above, the evanescent data 208 may be temporary data that includes a contact name and a phone number associated with a service provider. The retention data 216 may be indicative of parameters to prevent access to the evanescent data. The parameters may include one or more of, phone call information indicative of a communication from the service personnel, text information indicative of a communication from the service personnel or time information indicative of an expiration of a period of time. The communication data 114, in one implementation, may be indicative of a phone call. In another implementation, the communication data 114 may be indicative of a text message. The call log data 824 may be indicative of at least the contact name, the phone number, a general phone number associated with the service provider or the user device 106(2), a general name associated with a company that the user 104(2) works for or is a contract worker for, or a combination thereof.

Figure 9:
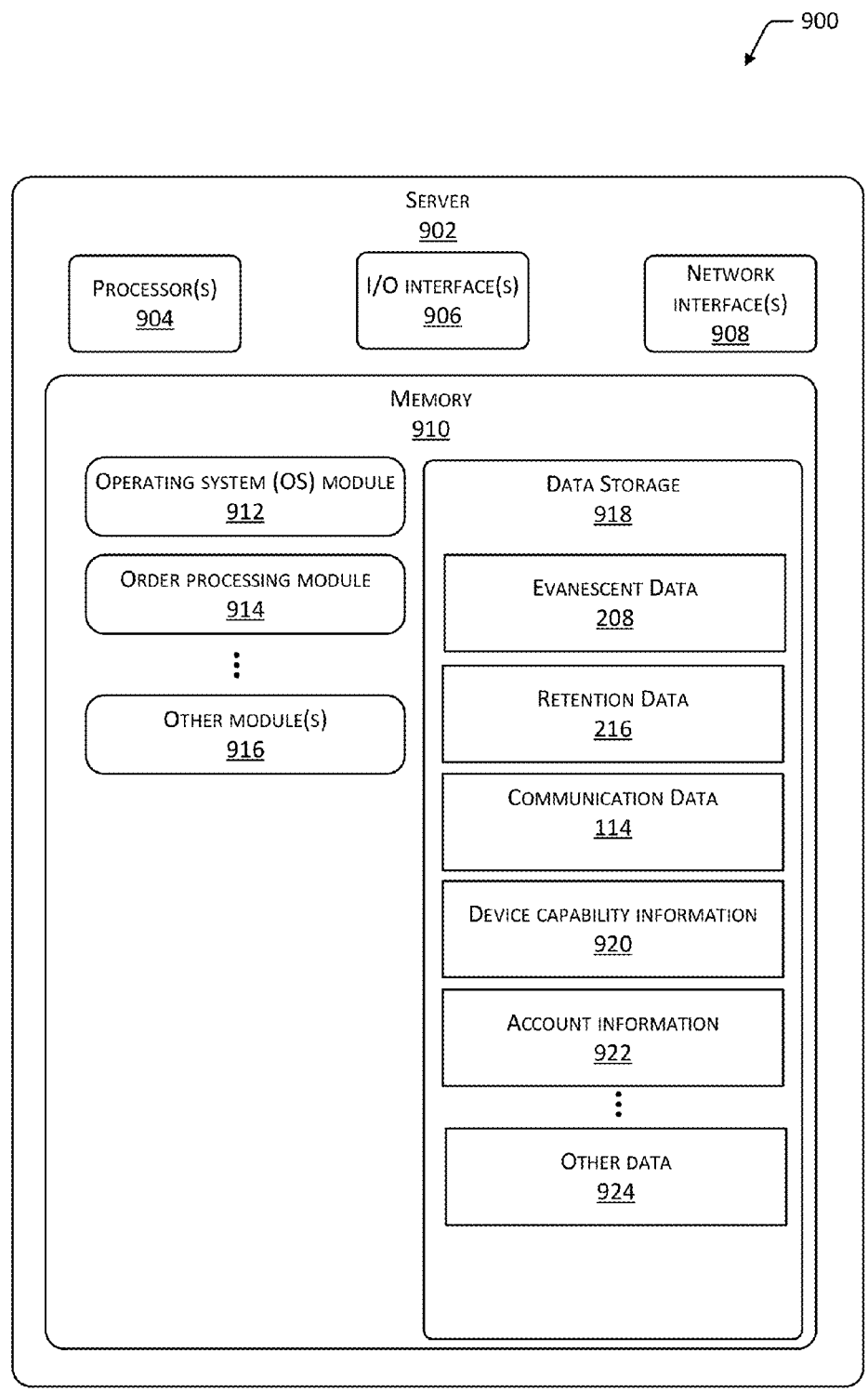
FIG. 9 illustrates a block diagram of a server configured to share and present temporary identification information.

FIG. 9 illustrates a block diagram 900 of the server 902. The server 902 is illustrative and non-limiting, and may be defined by a rack-mounted server or another suitable apparatus. The server 902 may correspond to the application server 102, the application service 210, or a combination thereof. The server 902 may include one or more processor(s) 904 configured to execute one or more stored instructions. The processor(s) 904 may comprise one or more cores, and may also be referred to as hardware processors.

The server 902 may include one or more I/O interface(s) 906 to allow the processor(s) 904 or other portions of the server 902 to communicate with user device 106, other servers 102, other services 210, computing devices, web-based resources, and so on. The I/O interface(s) 906 may comprise I2C, SPI, USB, RS-232, and so forth.

The server 902 may also include one or more network interface(s) 908. The network interfaces 908 are configured to provide communications with other servers 102, various services 210, web-based resources, routers, wireless access points, and so forth. The network interfaces 908 may include wireless functions, devices configured to couple to one or more networks including LANs, Wireless-LANs, WANs, and so forth. The server 902 may also include one or more busses or other internal communications hardware or software that allow for the transfer of data between the various modules and components of the server 902.

The server 902 includes one or more memories 910. The memory 910 comprises one or more CRSM. The memory 910 provides storage of computer readable instructions, which enable the server 902 to present the available item 404, data structures, program modules, and other data for the operation of the server 902. The memory 910 may include at least one operating system (OS) module 912. Respective OS modules 912 are configured to manage hardware devices such as the I/O interface(s) 906, the network interface(s) 908, and provides various services to applications or modules executing on the processor(s) 904.

Also stored in the memory 910 may be one or more of the following modules. These modules may be executed as foreground applications, background tasks, and so forth. An order processing module 914 such that order data, the evanescent data 208, the retention data 216, or other data, may be communicated to and from the user device 106 and the one or more services 210. The order processing module 914 may be configured to complete an order for one or more selected items as described above.

The memory 910 may also include one or more other module(s) 916. The other module(s) 916 may include cellular communications circuitry, a watchdog or other timer, a wireless internet receiver, secured data handling or communications resources, and so forth.

The memory 910 may also include data storage 918 to store information. The data storage 918 may use a flat file, database, linked list, tree, executable code, or other data structure to store the information. In some implementations, the data storage 918 or a portion of the data storage 918 may be distributed across one or more other servers 102, or other services 210, or computing devices, network attached storage apparatus, and so forth.

The data storage 918 may store the evanescent data 208, the retention data 216, and the communication data 114 as described above. The data storage 918 may also store device capability information 920. The device capability information 920 may include information such as, the user device 106 specifications, connection speed, type of network connection, OS version of the media device 106, device software version and so forth. The data storage 918 may also store account information 922. The account information 922 may include information such as, user preferences, account status, age of the account, shipping address, billing address, payment options, and so forth. The data storage 918 may further store other data 924. For example, the other data 924 may include one or more data items such as purchase history, and so forth.

Additionally, those having ordinary skill in the art readily recognize that the techniques described above can be utilized in a variety of devices, environments and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A device comprising:
   a display device;
   at least one memory storing computer-executable instructions, the memory including secure storage; and
   at least one processor in communication with the display device and the at least one memory, the at least one processor executes the computer-executable instructions to:
      receive, from another device, evanescent data comprising contact information including at least a contact name and a phone number associated with a service provider, and retention data indicative of a period of time that access to the evanescent data is allowed;
      store in the secure storage within the at least one memory the evanescent data and the retention data;
      determine receipt of an incoming call from the phone number associated with the service provider;
      access the evanescent data and the retention data from the secure storage;
      present, via the display device, the contact name of the service provider associated with the phone number;
      determine the period of time that access to the evanescent data is allowed, as specified by the retention data, has expired; and
      control access to the evanescent data from the secure storage based on determining the period of time has expired.

2. The device of claim 1, wherein the at least one processor executes the computer-executable instructions to:
   intercept data associated with the incoming call, wherein the data includes the phone number and the contact name; and
   write within a call log of the device at least the contact name and a general phone number associated with the service provider, wherein the write within the call log omits the phone number associated with the contact name.

3. The device of claim 1, wherein the evanescent data includes one or more of:
   a general phone number of a phone associated with the service provider;
   a company name associated with the service provider; or
   an image associated with the contact name.

4. A method comprising:
   receiving, at a first device, evanescent data and retention data sent by a second device, the evanescent data indicative of contact information, the retention data indicative of parameters associated with a period of time that access to the evanescent data is allowed;
   storing the evanescent data and the retention data in secure storage of the first device;
   receiving a first communication from a source identifier indicated by the contact information;
   accessing the evanescent data and the retention data from the secure storage;
   presenting at least a portion of the evanescent data responsive to the first communication;
   determining accessibility of the evanescent data based on whether the parameters of the retention data exceed a threshold value; and
   controlling access to the at least a portion of the evanescent data based on the parameters exceeding the threshold value.

5. The method of claim 4, wherein the retention data indicative of the parameters includes one or more of:
   phone call information indicative of the first communication from the source identifier;
   text information indicative of the first communication from the source identifier; or
   time information indicative of an expiration of the period of time, wherein the period of time begins after receiving the evanescent data or after receiving the communication from the source identifier.

6. The method of claim 4, wherein the evanescent data indicative of the contact information includes at least a contact name and a phone number; and wherein the method further comprising:
   generating a first contact list to include public contact fields and hidden contact fields, wherein the public contact fields includes a contact name field associated with at least the contact name, and wherein the hidden contact fields includes a phone number field associated with at least the phone number;
   adding the evanescent data to the first contact list; and
   wherein presenting the at least a portion of the evanescent data responsive to the first communication comprises:
      presenting the contact name located in the contact name field; and
      omitting presentation of the phone number located in the hidden contact field.

7. The method of claim 4, further comprising:
   receiving authentication data indicative of a code that authenticates the source identifier; and
   verifying that the code matches a second code that is included with the evanescent data.

8. The method of claim 4, further comprising:
   receiving a notification request from a server to access a contact list to store the evanescent data that includes at least a contact name and a phone number;
   receiving a user input to allow the server access to the contact list;
   generating a contact location to store the evanescent data, the contact location to include a public contact field and hidden contact field, wherein the public contact field includes a contact name field associated with the contact name, and wherein the hidden contact fields includes a phone number field associated with at least the phone number;
   adding the evanescent data to the first contact list, via the server; and
   wherein presenting the at least a portion of the evanescent data responsive to the first communication comprises:
      presenting the contact name located in the contact name field; and omitting presentation of the phone number located in the hidden contact field.

9. The method of claim 4, further comprising:
receiving a general phone number associated with a service provider name; and
wherein presenting the at least a portion of the evanescent data responsive to the first communication comprises:
presenting the contact name associated with the contact information and the general phone number; and
recording within a call log the contact name and the general phone number.

10. The method of claim 4, further comprising:
determining a first location of the second device;
decrypting a first portion of the contact information associated with first evanescent data based on the first location;
determining a second location of the second device; and
decrypting a second portion of the contact information associated with second evanescent data based on the second location.

11. The method of claim of claim 4, further comprising:
receiving notification data indicative of a notification request from the source identifier indicated by the contact information to have the contact information added to a contact list;
receiving a user input indicative of a command to add the contact information to the contact list; and
adding the contact information to the contact list.

12. The method of claim 4, further comprising:
receiving, from the source identifier, first authentication data;
sending, to the source identifier, second authentication data;
determining that the first authentication data and the second authentication data match within a threshold value;
receiving, from the source identifier, first verification data; and
sending, to the source identifier, second verification data.

13. The method of claim 4, wherein the evanescent data indicative of the contact information includes at least a contact name and a phone number, and the controlling access to the evanescent data includes preventing access to the evanescent data; and
the method further comprising:
receiving general data indicative of a general phone number and a service provider name associated with the contact information;
intercepting data associated with the communication, wherein the data includes the general phone number and the contact name; and
writing within a call log at least the general phone number and the service provider name, after preventing access to the at least portion of the evanescent data.

14. The method of claim 4, wherein the evanescent data indicative of the contact information includes at least a contact name and a phone number, and the controlling access to the evanescent data includes preventing access to the evanescent data; and
wherein preventing access to the at least portion of the evanescent data comprises one or more of:
deleting the phone number, the contact name, or the phone number and the contact name;
preventing a second communication to be sent to the phone number associated with the contact information; or overwriting the evanescent data with general data indicative of a service provider name and a general phone number.

15. A system comprising:
a first device with a hardware processor that executes instructions to:
determine contact information associated with a source identifier;
generate evanescent data indicative of the contact information;
generate retention data indicative of parameters to control access to the evanescent data;
send the evanescent data; and
send the retention data;
a second device with a hardware processor that executes instruction to:
receive, from the first device, the evanescent data indicative of the contact information;
receive, from the first device, the retention data indicative of the parameters to control access to the evanescent data;
store the evanescent data and the retention data in secure storage;
receive a communication from the source identifier indicated by the contact information;
access the evanescent data and the retention data from the secure storage;
generate data to present at least a portion of the evanescent data responsive to the communication;
determine accessibility of the evanescent data based on whether the retention data indicative of the parameters exceeds a threshold value; and
control access to the at least a portion of the evanescent data based on parameters exceeding the threshold value.

16. The system of claim of claim 15, wherein the evanescent data includes one or more of:
a general phone number of a phone associated with the service provider;
a company name associated with the service provider; or
an image associated with the contact name.

17. The system of claim 15, wherein the evanescent data indicative of the contact information includes at least a contact name and a phone number, and
wherein the secure storage of the memory stores the evanescent data in an encrypted format and comprises:
a contact location to store the encrypted evanescent data, the contact location to include a public contact field and hidden contact field, wherein the public contact field includes a contact name field associated with the contact name, and wherein the hidden contact fields includes a phone number field associated with at least the phone number.

18. The system of claim of claim 15, wherein the second device with the hardware processor further executes instructions to:
receive a general phone number associated with a contact name; and
wherein present the at least portion of the evanescent data responsive to the communication comprises:
present the contact name and the general phone number; and
record within a call log the contact name and the general phone number.

19. The system of claim 15, wherein the control access to the at least a portion of the evanescent data based on the retention data indicative of the parameters exceeds the threshold value includes presenting access to the at least portion of the evanescent data, the second device with the hardware processor further executes instructions to:
- determine that at least one of the parameters have been met, wherein the at least one parameter is associated with an expiration of time after receiving the communication; and
- wherein preventing access to the at least portion of the evanescent data comprises:
    - overwriting the evanescent data with general data that includes at least a general phone number associated with a service provider name.

20. The system of claim 15, wherein the control access to the at least a portion of the evanescent data based on the retention data indicative of the parameters exceeds the threshold value includes presenting access to the at least portion of the evanescent data, the second device with the hardware processor further executes instructions to:
- receive general data indicative of a general phone number and a service provider name; and
- overwrite within a call log at least a contact name and a phone number associated with the contact information with the service provider name and the general phone number, after preventing access to the at least portion of the evanescent data.

* * * * *